US012659993B2

(12) United States Patent
Rayapati et al.

(10) Patent No.: US 12,659,993 B2
(45) Date of Patent: Jun. 16, 2026

(54) TARGET WAKE TIME PROBE RESPONSE OR BEACON FOR EXTENDED PERSONAL AREA NETWORK

(71) Applicant: QUALCOMM Incorporated, San Diego, CA (US)

(72) Inventors: Sushma Rayapati, Hyderabad (IN); Vamsi Sanka, Hyderabad (IN); Sriman Miryala, Hyderabad (IN); Ashwini Kumar Singh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/349,454

(22) Filed: Jul. 10, 2023

(65) Prior Publication Data

US 2025/0024497 A1 Jan. 16, 2025

(51) Int. Cl.
H04W 74/0816 (2024.01)
H04W 12/06 (2021.01)
H04W 74/08 (2009.01)

(52) U.S. Cl.
CPC ....... H04W 74/0816 (2013.01); H04W 12/06 (2013.01); H04W 74/0866 (2013.01)

(58) Field of Classification Search
CPC ............. H04W 74/0816; H04W 12/06; H04W 74/0866
See application file for complete search history.

(56) References Cited

U.S. PATENT DOCUMENTS

| | | | | |
|---|---|---|---|---|
| 10,791,516 | B1* | 9/2020 | Chu | H04W 52/0216 |
| 2014/0369234 | A1* | 12/2014 | Vleugels | H04W 8/005 370/254 |
| 2023/0020265 | A1 | 1/2023 | Min et al. | |
| 2023/0128203 | A1* | 4/2023 | Yoon | H04W 52/0216 370/338 |
| 2024/0015597 | A1* | 1/2024 | Choi | H04W 28/24 |

FOREIGN PATENT DOCUMENTS

| | | |
|---|---|---|
| WO | 2022092525 A1 | 5/2022 |
| WO | 2023069144 A1 | 4/2023 |

OTHER PUBLICATIONS

International Search Report and Written Opinion—PCT/US2024/033769—ISA/EPO—Oct. 24, 2024.

* cited by examiner

*Primary Examiner* — Kevin M Cunningham
(74) *Attorney, Agent, or Firm* — Harrity & Harrity, LLP

(57) ABSTRACT

Various aspects of the present disclosure generally relate to wireless communication. In some aspects, a central device may receive, from a peripheral device, a probe request in a first extended personal area network (XPAN) time window. The central device may transmit, to the peripheral device in the first XPAN time window, a probe response with a target wake time that indicates XPAN time windows during which communications with the central device are allowed. Numerous other aspects are described.

21 Claims, 15 Drawing Sheets

800

200

Flash
210

Memory
206

ROM
208

MMU
240

Processor(s)
202

Connector
Interface
220

Display
Circuitry
204

Display
242

Antenna
235c

Antenna
235d

WLAN
Controller
250

254

WPAN
Controller
252

Antenna
235a

Antenna
235b

WWAN
Controller
256

258

260

Radio
230

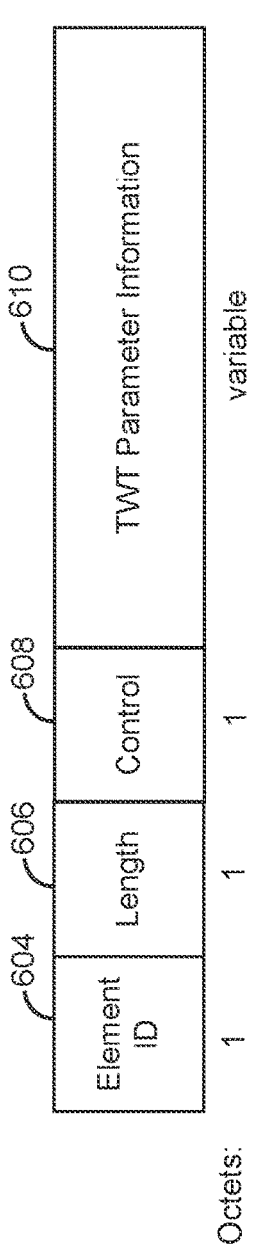
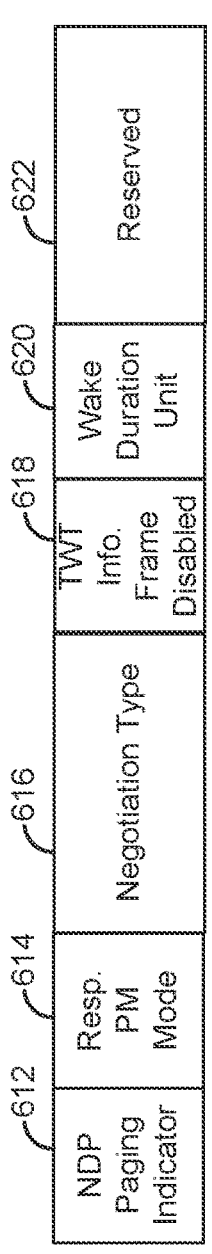
FIG. 6

1010 Receive, from a peripheral device, a probe request in a first extended personal area network (XPAN) time window 1020 Transmit, to the peripheral device in the first XPAN time window, a probe response with a target wake time (TWT) that indicates XPAN time windows during which communications with the central device are allowed

1000

1110 — Transmit, to a central device, a probe request for a TWT that indicates XPAN time windows during which communications with the central device are allowed 1120 — Receive, from the central device in a first XPAN time window, a probe response with the TWT

1100

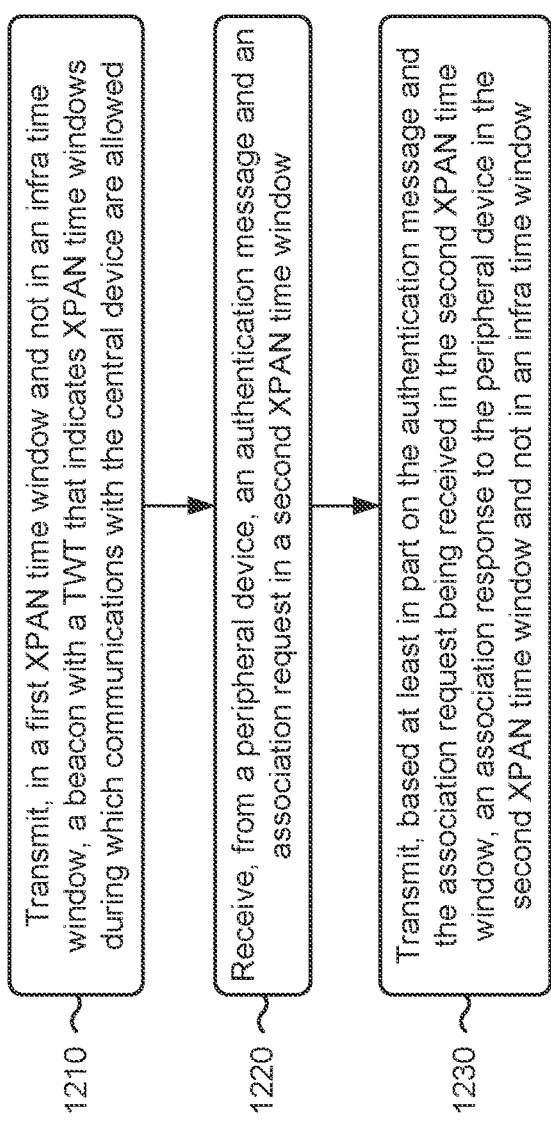

1210  Transmit, in a first XPAN time window and not in an infra time window, a beacon with a TWT that indicates XPAN time windows during which communications with the central device are allowed 1220  Receive, from a peripheral device, an authentication message and an association request in a second XPAN time window 1230  Transmit, based at least in part on the authentication message and the association request being received in the second XPAN time window, an association response to the peripheral device in the second XPAN time window and not in an infra time window

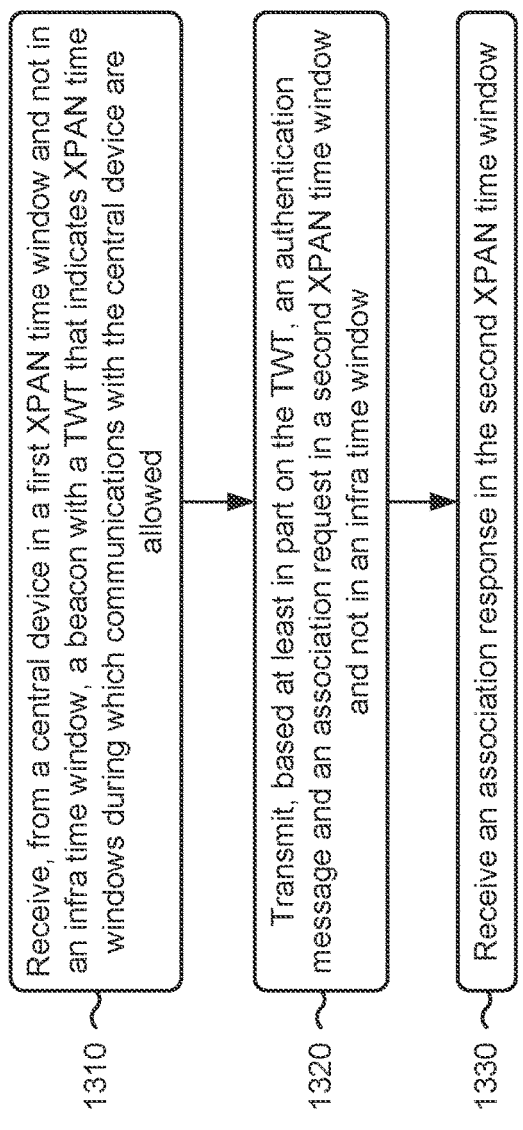

1310 Receive, from a central device in a first XPAN time window and not in an infra time window, a beacon with a TWT that indicates XPAN time windows during which communications with the central device are allowed 1320 Transmit, based at least in part on the TWT, an authentication message and an association request in a second XPAN time window and not in an infra time window 1330 Receive an association response in the second XPAN time window

TARGET WAKE TIME PROBE RESPONSE OR BEACON FOR EXTENDED PERSONAL AREA NETWORK

FIELD OF THE DISCLOSURE

Aspects of the present disclosure generally relate to wireless communication and to techniques and apparatuses associated with a target wake time probe response or beacon for an extended personal area network.

BACKGROUND

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

A wireless personal area network (WPAN) is a short-range wireless network typically established by a user to interconnect various personal devices, sensors, and/or appliances located within a certain distance or area of the user. For example, a WPAN based on a communication protocol such as a Bluetooth® (BT) protocol, a Bluetooth Low Energy (BLE) protocol, or a Zigbee® protocol may provide wireless connectivity to peripheral devices that are within a specific distance (e.g., 5 meters, 10 meters, 20 meters, 100 meters) of each other. Bluetooth is a short-range wireless communication protocol that supports a WPAN between a central device (such as a host device or a source device) and at least one peripheral device (such as a client device or a sink device). However, power consumption associated with Bluetooth communications that operate on a basic rate (BR) and/or enhanced data rate (EDR) physical layer may render WPAN communication impractical in certain applications.

Accordingly, to address the power consumption challenges associated with Bluetooth BR/EDR (sometimes referred to as a Bluetooth classic or Bluetooth legacy protocol), BLE (also referred to herein as WPAN LE) was developed and adopted in various applications in which data transfers are relatively infrequent and/or to enable WPAN communication with low power consumption. For example, BLE exploits infrequent data transfer by using a low duty cycle operation and placing one or both of the central device and the peripheral device(s) into a sleep mode between data transmissions, thereby conserving power. Example applications that use BLE include battery-operated sensors and actuators in various medical, industrial, consumer, and fitness applications. BLE may also be used to connect devices such as BLE-enabled smartphones, tablets, laptops, earbuds, or the like. While traditional (or classic) Bluetooth and BLE offer certain advantages, there exists a need for further improvements in Bluetooth and BLE technology. For example, traditional Bluetooth and BLE have a limited range, have a limited data throughput, and are susceptible to interference from other devices communicating in the same frequency band (such as via WLAN communications). An extended PAN (XPAN) may be a WPAN that uses Wi-Fi to extend its range.

SUMMARY

Some aspects described herein relate to a method of wireless communication performed by a central device. The method may include receiving, from a peripheral device, a probe request in a first extended personal area network (XPAN) time window. The method may include transmitting, to the peripheral device in the first XPAN time window, a probe response with a target wake time (TWT) that indicates XPAN time windows during which communications with the central device are allowed. The first XPAN time window may be an available XPAN window. The second XPAN time window may be one of further XPAN windows.

Some aspects described herein relate to a method of wireless communication performed by a peripheral device. The method may include transmitting, to a central device, a probe request for a TWT that indicates XPAN time windows during which communications with the central device are allowed. The method may include receiving, from the central device in a first XPAN time window, a probe response with the TWT.

Some aspects described herein relate to a method of wireless communication performed by a central device. The method may include transmitting, in a first XPAN time window and not in an infra time window, a beacon with a TWT that indicates XPAN time windows during which communications with the central device are allowed. The method may include receiving, from a peripheral device, an authentication message and an association request in a second XPAN time window. The method may include transmitting, based at least in part on the authentication message and the association request being received in the second XPAN time window, an association response to the peripheral device in the second XPAN time window and not in an infra time window.

Some aspects described herein relate to a method of wireless communication performed by a peripheral device. The method may include receiving, from a central device in a first XPAN time window and not in an infra time window, a beacon with a TWT that indicates XPAN time windows during which communications with the central device are allowed. The method may include transmitting, based at least in part on the TWT, an authentication message and an association request in a second XPAN time window and not in an infra time window. The method may include receiving an association response in the second XPAN time window.

Some aspects described herein relate to a central device for wireless communication. The central device may include one or more memories and one or more processors coupled to the one or more memories. The one or more processors may be individually or collectively configured to receive, from a peripheral device, a probe request in a first XPAN time window. The one or more processors may be individually or collectively configured to transmit, to the peripheral device in the first XPAN time window, a probe response with a TWT that indicates XPAN time windows during which communications with the central device are allowed.

Some aspects described herein relate to a peripheral device for wireless communication. The peripheral device may include one or more memories and one or more processors coupled to the one or more memories. The one or more processors may be individually or collectively configured to transmit, to a central device, a probe request for a TWT that indicates XPAN time windows during which communications with the central device are allowed. The one or more processors may be individually or collectively configured to receive, from the central device in a first XPAN time window, a probe response with the TWT.

Some aspects described herein relate to a central device for wireless communication. The central device may include one or more memories and one or more processors coupled to the one or more memories. The one or more processors may be individually or collectively configured to transmit, in a first XPAN time window and not in an infra time window, a beacon with a TWT that indicates XPAN time windows during which communications with the central device are allowed. The one or more processors may be individually or collectively configured to receive, from a peripheral device, an authentication message and an association request in a second XPAN time window. The one or more processors may be individually or collectively configured to transmit, based at least in part on the authentication message and the association request being received in the second XPAN time window, an association response to the peripheral device in the second XPAN time window and not in an infra time window.

Some aspects described herein relate to a peripheral device for wireless communication. The peripheral device may include one or more memories and one or more processors coupled to the one or more memories. The one or more processors may be individually or collectively configured to receive, from a central device in a first XPAN time window and not in an infra time window, a beacon with a TWT that indicates XPAN time windows during which communications with the central device are allowed. The one or more processors may be individually or collectively configured to transmit, based at least in part on the TWT, an authentication message and an association request in a second XPAN time window and not in an infra time window. The one or more processors may be individually or collectively configured to receive an association response in the second XPAN time window.

Some aspects described herein relate to a non-transitory computer-readable medium that stores a set of instructions for wireless communication by a central device. The set of instructions, when executed by one or more processors of the central device, may cause the central device to receive, from a peripheral device, a probe request in a first XPAN time window. The set of instructions, when executed by one or more processors of the central device, may cause the central device to transmit, to the peripheral device in the first XPAN time window, a probe response with a TWT that indicates XPAN time windows during which communications with the central device are allowed.

Some aspects described herein relate to a non-transitory computer-readable medium that stores a set of instructions for wireless communication by a peripheral device. The set of instructions, when executed by one or more processors of the peripheral device, may cause the peripheral device to transmit, to a central device, a probe request for a TWT that indicates XPAN time windows during which communications with the central device are allowed. The set of instructions, when executed by one or more processors of the peripheral device, may cause the peripheral device to receive, from the central device in a first XPAN time window, a probe response with the TWT.

Some aspects described herein relate to a non-transitory computer-readable medium that stores a set of instructions for wireless communication by a central device. The set of instructions, when executed by one or more processors of the central device, may cause the central device to transmit, in a first XPAN time window and not in an infra time window, a beacon with a TWT that indicates XPAN time windows during which communications with the central device are allowed. The set of instructions, when executed by one or more processors of the central device, may cause the central device to receive, from a peripheral device, an authentication message and an association request in a second XPAN time window. The set of instructions, when executed by one or more processors of the central device, may cause the central device to transmit, based at least in part on the authentication message and the association request being received in the second XPAN time window, an association response to the peripheral device in the second XPAN time window and not in an infra time window.

Some aspects described herein relate to a non-transitory computer-readable medium that stores a set of instructions for wireless communication by a peripheral device. The set of instructions, when executed by one or more processors of the peripheral device, may cause the peripheral device to receive, from a central device in a first XPAN time window and not in an infra time window, a beacon with a TWT that indicates XPAN time windows during which communications with the central device are allowed. The set of instructions, when executed by one or more processors of the peripheral device, may cause the peripheral device to transmit, based at least in part on the TWT, an authentication message and an association request in a second XPAN time window and not in an infra time window. The set of instructions, when executed by one or more processors of the peripheral device, may cause the peripheral device to receive an association response in the second XPAN time window.

Some aspects described herein relate to an apparatus for wireless communication. The apparatus may include means for receiving, from another apparatus, a probe request in a first XPAN time window. The apparatus may include means for transmitting, to the other apparatus in the first XPAN time window, a probe response with a TWT that indicates XPAN time windows during which communications with the apparatus are allowed.

Some aspects described herein relate to an apparatus for wireless communication. The apparatus may include means for transmitting, to another apparatus, a probe request for a TWT that indicates XPAN time windows during which communications with the other apparatus are allowed. The apparatus may include means for receiving, from the other apparatus in a first XPAN time window, a probe response with the TWT.

Some aspects described herein relate to an apparatus for wireless communication. The apparatus may include means for transmitting, in a first XPAN time window and not in an infra time window, a beacon with a TWT that indicates XPAN time windows during which communications with the apparatus are allowed. The apparatus may include means for receiving, from a peripheral device, an authentication message and an association request in a second XPAN time window. The apparatus may include means for transmitting, based at least in part on the authentication message and the association request being received in the second XPAN time window, an association response to the other apparatus in the second XPAN time window and not in an infra time window.

Some aspects described herein relate to an apparatus for wireless communication. The apparatus may include means for receiving, from another apparatus in a first XPAN time window and not in an infra time window, a beacon with a TWT that indicates XPAN time windows during which communications with the apparatus are allowed. The apparatus may include means for transmitting, based at least in part on the TWT, an authentication message and an association request in a second XPAN time window and not in an infra time window. The apparatus may include means for receiving an association response in the second XPAN time window.

Aspects generally include a method, apparatus, system, computer program product, non-transitory computer-readable medium, user equipment, base station, network entity, network node, central device, peripheral device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of target wake time (TWT) information, in accordance with the present disclosure.

FIG. 12 is a diagram illustrating an example process performed, for example, by a central device, in accordance with the present disclosure.

FIG. 13 is a diagram illustrating an example process performed, for example, by a peripheral device, in accordance with the present disclosure.

DETAILED DESCRIPTION

Figure 1:
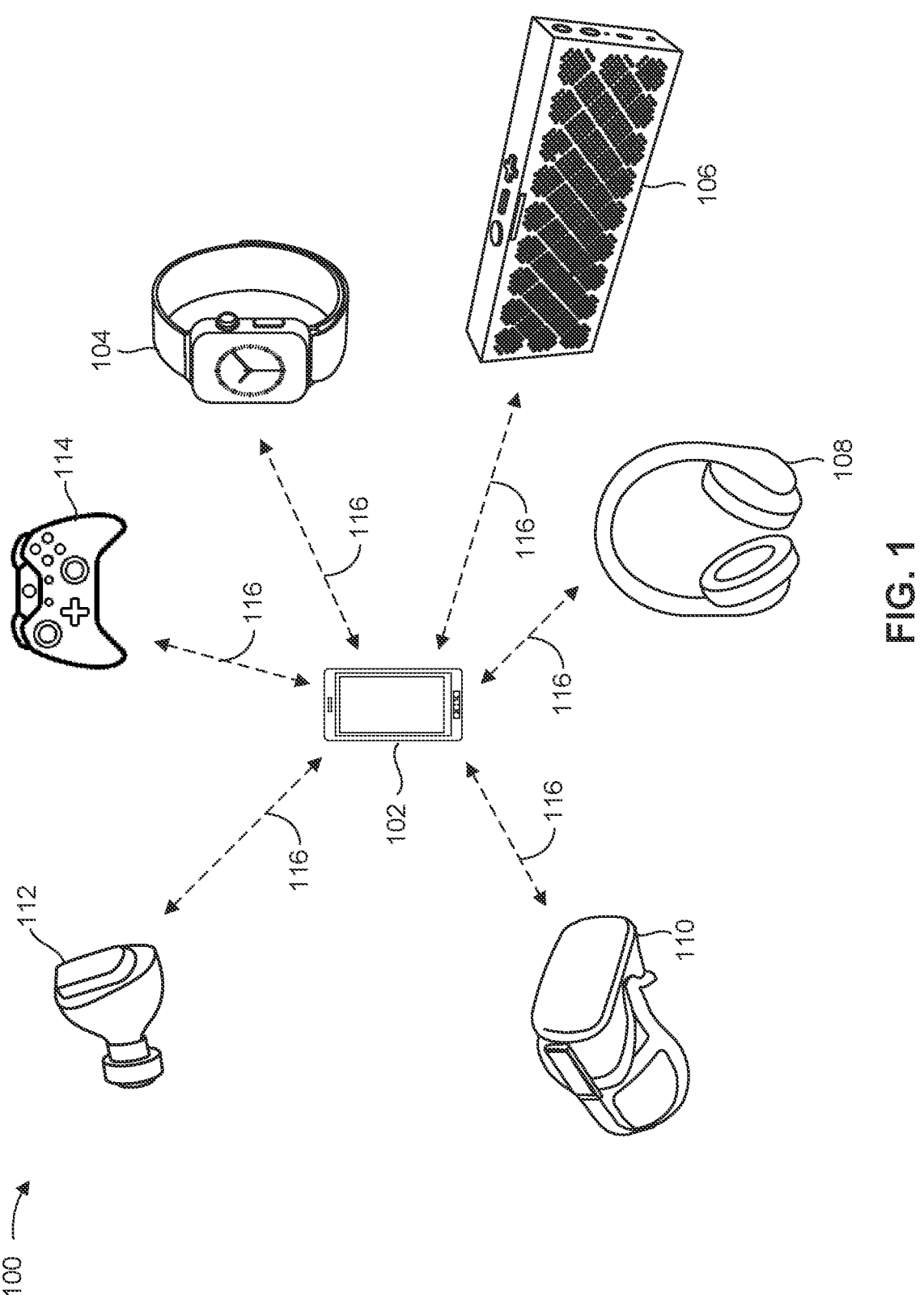
FIG. 1 is a diagram illustrating an example of a wireless personal area network (WPAN), in accordance with the present disclosure.

In a wireless personal area network (WPAN), such as a Bluetooth (BT) network or a Bluetooth Low Energy (BLE) network, wireless audio may stream from a central source device (e.g., a handset, soft AP (SAP)) to multiple peripheral devices (e.g., earbuds). Wi-Fi features of an access point (AP) in a wireless local area network (WLAN) may also be used for communications in the WPAN. A wireless communication device, such as a handset or a mobile station (STA), may operate as part of an XPAN that provides whole house coverage. In some XPAN techniques, the handset does not indicate the availability of XPAN time windows, and no unicast frames are to be triggered from an earbud during infra time windows. If the earbud transmits a message during an infra time window, when the handset can be communicating with another device (e.g., AP, gNB), the message is not received by the handset and the message is wasted. For example, an association message or a TWT setup message transmitted during an infra time window is wasted. Wasted messages waste power and signaling resources.

According to various aspects described herein, a central device of an XPAN, such as a handset 810 (e.g., wireless communication device 200, user equipment (UE), XPAN SAP), may indicate the availability or unavailability of TWT service periods (SPs)/XPAN time windows to a peripheral device, such as an earbud (e.g., wireless communication device 200) using broadcast TWTs in beacons or probe responses with a TWT such that unicast earbud transmissions to the handset are during the XPAN time windows. The earbuds, upon detecting the handset from beacons or probe responses, may restrict the association and TWT setup to TWT SPs/XPAN time windows. In this way, fewer retry messages are wasted. Signaling resources are conserved and connection latency is reduced.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a WPAN 100, according to some implementations. Within the WPAN 100, a central device 102 (which may be referred to herein as a source device or using other suitable terminology), such as a UE, AP, XPAN SAP, or gaming console, may connect to and may establish a communication link 116 with one or more peripheral devices, such as a smartwatch 104, a portable speaker 106, wireless headphones 108, a head-mounted device (HMD) or extended (XR) reality headset 110, a wireless earbud 112, a wireless game controller 114 (which may be referred to herein as sink devices or using other suitable terminology) using a BLE protocol, a modified BLE protocol, or the Institute of Electrical and Electronics Engineers (IEEE) 802.11 family of standards. The BLE protocol is part of the BT core specification and enables radio frequency communication operating within the globally accepted 2.4 GHz Industrial, Scientific, and Medical (ISM) band.

In some aspects, as described herein, the central device 102 may include suitable logic, circuitry, interfaces, processors, and/or code that may be used to communicate with the one or more peripheral devices 104, 106, 108, 110, 112, and/or 114 using the BLE protocol, the modified BLE protocol, or IEEE 802.11 protocols. In some aspects, the central device 102 may operate as an initiator to request establishment of a link layer (LL) connection with an intended peripheral device 104, 106, 108, 110, 112, and/or 114. In some aspects, a link manager may be used to control operations between a WPAN application controller in the central device 102 and a WPAN application controller in each of the intended peripheral devices 104, 106, 108, 110, 112, and/or 114.

In some aspects, after a requested LL connection is established, the central device 102 may become a host device, and the selected or intended peripheral device 104, 106, 108, 110, 112, and/or 114 may become paired with the central device 102 over the established LL connection. As a host device, the central device 102 may support multiple concurrent LL connections with various peripheral devices 104, 106, 108, 110, 112, and/or 114 that are operating as client devices. For example, the central device 102 may manage various aspects of data packet communication in an LL connection with one or more associated peripheral devices 104, 106, 108, 110, 112, and/or 114. For example, the central device 102 may determine an operation schedule in the LL connection with one or more peripheral devices 104, 106, 108, 110, 112, and/or 114. The central device 102 may also initiate an LL protocol data unit (PDU) exchange sequence over the LL connection. LL connections may be configured to run periodic connection events in dedicated data channels. The exchange of LL data PDU transmissions between the central device 102 and one or more of the peripheral devices 104, 106, 108, 110, 112, and/or 114 may take place within connection events.

In some aspects, the central device 102 may be configured to transmit the first LL data PDU in each connection event to an intended peripheral device 104, 106, 108, 110, 112, and/or 114. Additionally, or alternatively, in some aspects, the central device 102 may utilize a polling scheme to poll the intended peripheral device 104, 106, 108, 110, 112, and/or 114 for an LL data PDU transmission during a connection event. The intended peripheral device 104, 106, 108, 110, 112, and/or 114 may transmit an LL data PDU upon receipt of a packet carrying an LL data PDU from the central device 102. In some other aspects, a peripheral device 104, 106, 108, 110, 112, and/or 114 may transmit an LL data PDU to the central device 102 without first receiving an LL data PDU from the central device 102.

Examples of the central device 102 may include a cellular phone, a smartphone, a session initiation protocol (SIP) phone, a STA, a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch or wireless headphones), a vehicle, a vehicle infotainment system or car kit, an electric meter, a gas pump, a toaster, a thermostat, a hearing aid, a blood glucose on-body unit, an Internet-of-Things (IoT) device, or the like.

Examples of the one or more peripheral devices 104, 106, 108, 110, 112, and/or 114 may include a cellular phone, a smartphone, an SIP phone, a STA, a laptop, a PC, a desktop computer, a PDA, a satellite radio, a global positioning system, a multimedia device, a video device, a digital audio player, a camera, a game console, a game controller, an XR device, an HMD, a tablet, a smart device, a wearable device (e.g., a smart watch, wireless headphones, or wireless earbuds), a vehicle, a vehicle infotainment system or car kit, an electric meter, a gas pump, a toaster, a thermostat, a hearing aid, a blood glucose on-body unit, an IoT device, or the like. Although the central device 102 is illustrated in FIG. 1 as being in communication with six peripheral devices 104, 106, 108, 110, 112, and 114 in the WPAN 100, it will be appreciated that the central device 102 may communicate with more or fewer than six peripheral devices within the WPAN 100 without departing from the scope of the present disclosure.

In some aspects, a device implementing the BT protocol (e.g., the central device 102) may operate according to a first radio mode (e.g., a basic rate (BR)/enhanced data rate (EDR) radio mode), a device implementing the BLE protocol may operate according to a second radio mode (e.g., the BLE radio mode), and device operating using IEEE 802.11 protocols may operate according to a third radio mode. In some aspects, the central device 102 may be configured with multiple radio modes, and therefore may be able to operate according to the BR/EDR mode or the BLE mode, for example, based on the type of short-range wireless communication in which the central device 102 may engage. In some aspects, the central device 102 may operate using Wi-Fi links.

For example, in some aspects, the central device 102 may operate according to the BR/EDR mode or Wi-Fi mode for continuous streaming of data, for broadcast networks, for mesh networks, and/or for some other applications in which a relatively higher data rate may be more suitable. Additionally, or alternatively, the central device 102 may operate according to the BLE mode or Wi-Fi mode for short burst data transmissions, such as for some other applications in which power conservation may be desirable and/or a relatively lower data rate may be acceptable. Additionally, or alternatively, in some aspects, the central device 102 may operate according to one or more other radio modes, such as proprietary radio mode(s). Examples of other radio modes may include high speed radio modes, low energy radio modes, and/or isochronous radio modes, among other examples.

In some aspects, as described in more detail elsewhere herein, an assisting wireless device (e.g., among peripheral devices 104, 106, 108, 110, 112, and 114) may track a first retransmission metric that is based on a number of retransmitted packets that the assisting wireless device received from a source device, such as the central device 102. The assisting wireless device may receive, from a sink wireless device (e.g., among peripheral devices 104, 106, 108, 110, 112, and 114), an acknowledgement assistance request indicating a second retransmission metric for the sink wireless device. The assisting wireless device may transmit, to the sink wireless device, a response to the acknowledgement assistance request based on respective values of the first retransmission metric and the second retransmission metric. Additionally, or alternatively, the assisting wireless device may perform one or more other operations described herein.

In some aspects, as described in more detail elsewhere herein, a sink wireless device (e.g., among peripheral devices 104, 106, 108, 110, 112, and 114) may track a first retransmission metric that is based on a number of retransmitted packets that the sink wireless device received from a source device, such as the central device 102. The sink wireless device may transmit, to an assisting wireless device (e.g., among peripheral devices 104, 106, 108, 110, 112, and 114), an acknowledgement assistance request indicating the first retransmission metric tracked by the sink wireless device. The sink wireless device may receive, from the assisting wireless device, a response to the acknowledgement assistance request based on respective values of the first retransmission metric tracked by the sink wireless device and a second retransmission metric tracked by the assisting wireless device. Additionally, or alternatively, the sink wireless device may perform one or more other operations described herein.

As indicated above, FIG. 1 is provided as an example. Other examples may differ from what is described with regard to FIG. 1.

Figure 2:
FIG. 2 is a diagram illustrating an example of a wireless communication device, in accordance with the present disclosure.

FIG. 2 is a diagram illustrating an example of a wireless communication device 200, in accordance with the present disclosure. In some aspects, the wireless communication device 200 may be an example of the central device 102 illustrated in FIG. 1. Additionally, or alternatively, the wireless communication device 200 may be an example of one or more of the peripheral devices 104, 106, 108, 110, 112, or 114 illustrated in FIG. 1. In some aspects, the wireless communication device 200 may be a Bluetooth-enabled device (such as a BLE device), an AP, or a STA.

As shown in FIG. 2, the wireless communication device 200 may include a processing element, such as processor(s) 202, which may execute program instructions for the wireless communication device 200. The wireless communication device 200 may also include a display 242 that can perform graphics processing and present information to a user. The processor(s) 202 may also be coupled to a memory management unit (MMU) 240, which may be configured to receive addresses from the processor(s) 202 and translate the addresses to address locations in memory such as memory 206, ROM 208, or flash memory 210 and/or to address locations in other circuits or devices, such as display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless communication device 200. For example, the wireless communication device 200 may include various memory types, a connector interface 220 through which the wireless communication device 200 can communicate with a computer system, and wireless communication subsystems that can transmit data to, and receive data from, other devices based on one or more wireless communication standards or protocols. For example, in some aspects, the wireless communication subsystems may include (but are not limited to) a wireless local-area network (WLAN) subsystem, a WPAN subsystem, and/or a cellular subsystem (such as a Long-Term Evolution (LTE) or New Radio (NR) subsystem). The wireless communication device 200 may include multiple antennas 235a, 235b, 235c, and/or 235d for performing wireless communication with, for example, wireless communication devices in a WPAN. In some aspects, the WPAN may be an XPAN.

The wireless communication device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an FPGA, and/or an application specific integrated circuit (ASIC).

In some aspects, the radio 230 may include separate controllers configured to control communications for various respective radio access technology (RAT) protocols. For example, as shown in FIG. 2, radio 230 may include a WLAN controller 250 that manages WLAN communications, a WPAN controller 252 that manages Bluetooth, BLE, and/or other suitable WPAN communications, and a wireless wide area network (WWAN) controller 256 that manages WWAN communications. In some aspects, the wireless communication device 200 may store and execute a WLAN software driver for controlling WLAN operations performed by the WLAN controller 250, a WPAN software driver for controlling WPAN operations performed by the WPAN controller 252, and/or a WWAN software driver for controlling WWAN operations performed by the WWAN controller 256.

In some aspects, a first coexistence interface 254 (such as a wired interface) may be used for sending information between the WLAN controller 250 and the WPAN controller 252. Additionally, or alternatively, in some aspects, a second coexistence interface 258 may be used for sending information between the WLAN controller 250 and the WWAN controller 256. Additionally, or alternatively, in some aspects, a third coexistence interface 260 may be used for sending information between the WPAN controller 252 and the WWAN controller 256.

In some aspects, one or more of the WLAN controller 250, the WPAN controller 252, and/or the WWAN controller 256 may be implemented as hardware, software, firmware, or any suitable combination thereof.

In some aspects, the WLAN controller 250 may be configured to communicate with a second device in a WPAN using a WLAN link using one or more, some, or all of the antennas 235a, 235b, 235c, and 235d. In other configurations, the WPAN controller 252 may be configured to communicate with at least one second device in a WPAN using one or more, some, or all of the antennas 235a, 235b, 235c, and 235d. In other configurations, the WWAN controller 256 may be configured to communicate with a second device in a WPAN using one or more, some, or all of the antennas 235a, 235b, 235c, and 235d. The WLAN controller 250, the WPAN controller 252, and/or the WWAN controller 256 may be configured to adjust a wakeup time interval and a shutdown time for the wireless communication device 200.

A short-range wireless communications protocol, such as BT, BLE, and/or BR/EDR, may include and/or may use one or more other communications protocols, for example, to establish and maintain communications links. Referring also to FIG. 1, the wireless communication device 200 may establish a communications link 116 with one or more peripheral devices, such as a wireless headset 112, according to at least one communications protocol for short-range wireless communications. In some aspects, the communications link 116 may include a communications link that adheres to a protocol included and/or for use with BT, BLE, BR/EDR, or the like. In one aspect, the communications link 116 may include an asynchronous connection-oriented logical (ACL) transport, sometimes referred to as an ACL link. When operating as an ACL link, the communications link 116 may allow the central device 102 (e.g., a source device) to connect or "pair" with a peripheral device, such as the headset 112. The connection is asynchronous in that the two devices may not need to synchronize, timewise, data communications between each other to permit communication of data packets via the communications link 116.

In some aspects, a logical link control and adaptation protocol (L2CAP) may be used within a BT protocol stack (not shown in FIG. 2 for simplicity). An L2CAP connection may be established after an ACL link has been established. Reference to L2CAP in the present disclosure may be further applicable to enhanced L2CAP (EL2CAP), which may be an enhanced version of the L2CAP protocol that enables multiplexing of multiple logical data channels via a single radio connection.

In some aspects, the communications link 116 may include an advanced audio distribution profile (A2DP) link. For example, an A2DP link may provide a point-to-point link between a source device, such as the central device 102, and a sink device, such as the headset 112. With an A2DP link, data packets including audio may be transmitted over an ACL channel, and other information (e.g., for controlling the audio stream) may be transmitted over a separate control channel. The data packets may occur non-periodically.

In some aspects, the communications link 116 may support synchronous logical transport mechanisms between a source device (such as the central device 102) and a peripheral device (such as the headset 112). For example, the communications link 116 may include a synchronous connection-oriented (SCO) link that provides a symmetric point-to-point link between the source device and the peripheral device using time slots reserved for BT communications. In some aspects, an SCO link may not support retransmission of data packets, which may be unsatisfactory in audio streaming and/or voice call use cases in which a dropped audio or voice packet may reduce the quality of the user experience.

In some aspects, the communications link 116 may include an extended SCO (eSCO) link. An eSCO link may provide a symmetric or asymmetric point-to-point link between a source device and a peripheral device using time slots reserved for BT communications, and may also provide for a retransmission window following the reserved time slots. Because retransmissions may be facilitated using the retransmission window, an eSCO link may be suitable for audio streaming and/or voice call use cases because a dropped audio or voice packet may be retransmitted, and therefore the probability of successfully receiving a data packet may be increased.

In some aspects, the communications link 116 shown in FIG. 1 may include an isochronous (ISO) link. When operating as an ISO link, the communications link 116 may combine some features of both synchronous and asynchronous links. For example, a stream on an ISO link may begin with a start packet, and then data packets may be asynchronously transmitted. On an ISO link, the number of retransmission attempts by a transmitting device may be limited. Thus, if a receiving device is unable to decode a data packet within the limited number of retransmission attempts, then the data packet may be dropped, and the receiving device may continue to receive the stream without data from the dropped data packet.

In some aspects, a central device (e.g., wireless communication device 200, handset, SAP, UE) includes means for receiving, from a peripheral device, a probe request in a first XPAN time window; and/or means for transmitting, to the peripheral device in the first XPAN time window, a probe response with a TWT that indicates XPAN time windows during which communications with the central device are allowed. In some aspects, the means for the central device to perform operations described herein may include, for example, one or more of antennas 235a-235d, WPAN controller 252, radio 230, and/or processor 202, among other examples.

In some aspects, the central device includes means for transmitting, in a first XPAN time window and not in an infra time window, a beacon with a TWT that indicates XPAN time windows during which communications with the central device are allowed; means for receiving, from a peripheral device, an authentication message and an association request in a second XPAN time window; and/or means for transmitting, based at least in part on the authentication message and the association request being received in the second XPAN time window, an association response to the peripheral device in the second XPAN time window and not in an infra time window.

In some aspects, a peripheral device (e.g., wireless communication device 200, earbuds) includes means for transmitting, to a central device, a probe request for a TWT that indicates XPAN time windows during which communications with the central device are allowed; and/or means for receiving, from the central device in a first XPAN time window, a probe response with the TWT. In some aspects, the means for the peripheral device to perform operations described herein may include, for example, one or more of antennas 235a-235d, WPAN controller 252, radio 230, and/or processor 202, among other examples.

In some aspects, the peripheral device includes means for receiving, from a central device in a first XPAN time window and not in an infra time window, a beacon with a TWT that indicates XPAN time windows during which communications with the central device are allowed; means for transmitting, based at least in part on the TWT, an authentication message and an association request in a second XPAN time window and not in an infra time window; and/or means for receiving an association response in the second XPAN time window.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

As indicated above, FIG. 2 is provided as an example. Other examples may differ from what is described with regard to FIG. 2.

Figure 3:
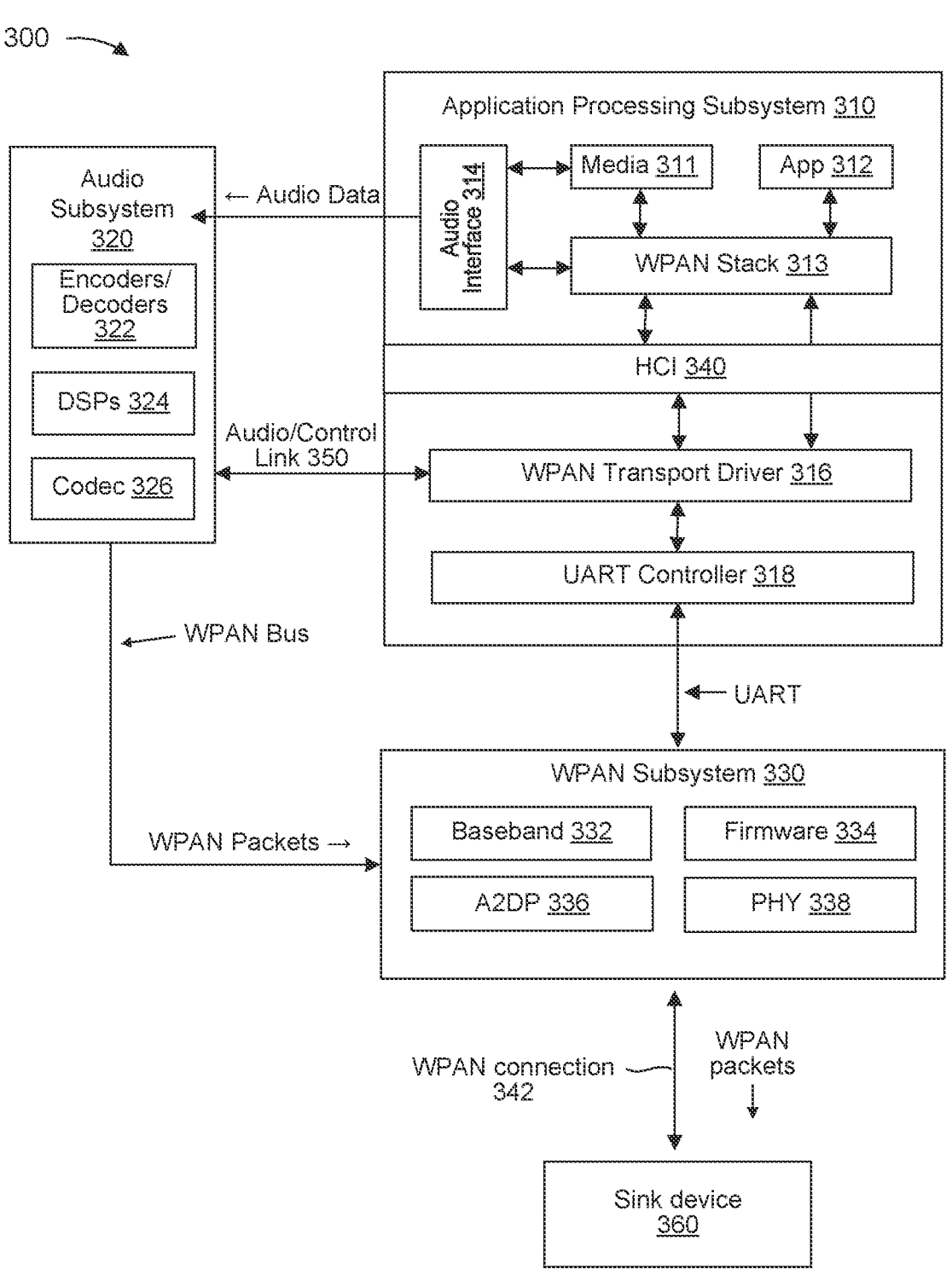
FIG. 3 is a diagram illustrating an example of a wireless communication device, in accordance with the present disclosure.

FIG. 3 is a diagram illustrating an example 300 of a wireless communication device 300, according to the present disclosure. In some aspects, the wireless communication device 300 may be an example of the central device 102 in FIG. 1, the wireless communication device 200 in FIG. 2, or a source device. In example 300, the wireless communication device 300 is depicted as having an established WPAN connection 342 (e.g., a Bluetooth communication connection or Wi-Fi communication connection) with a sink device 360 (e.g., peripheral device).

The wireless communication device 300 may include an application processing subsystem 310, an audio subsystem 320, a WPAN subsystem 330, and a host controller interface (HCI) 340. The application processing subsystem 310 is shown to include a media player 311, an application layer 312, a WPA STAck 313, and an audio interface 314. The media player 311 can be any suitable device or component capable of generating or receiving multimedia content including, for example, real-time audio streams, real-time video streams, real-time gaming streams, and/or latency-sensitive traffic, among other examples. The application layer 312 defines the collection of attributes and associated permissions to be used in communications. In some aspects, the application layer 312 may include processing resources including, for example, the memory 206, the ROM 208, and/or the flash memory 210 of FIG. 2. The WPA STAck 313 may be one implementation of a protocol stack.

In some aspects, as shown in FIG. 3, the application processing subsystem 310 may include a WPAN transport driver 316, which may include a split audio and packetization module (not shown for simplicity) that can packetize data (such as audio and/or video data) into frames that can be transmitted to a sink device. In some aspects, the WPAN transport driver 316 may be connected to the audio subsystem 320 via an audio and control link 350. In some aspects, the audio and control link 350 may be used to send encoded audio/video data and control signals between the WPAN transport driver 316 and audio/video DSPs within the audio subsystem 320. The WPAN transport driver 316 is also connected to a universal asynchronous receiver-transmitter (UART) controller 318 that provides controls for transmission of information via the WPAN connection 342.

The audio subsystem 320 may include encoders/decoders 322, one or more DSPs 324, and one or more codecs 326. The encoders/decoders 322 may be used to sample audio/video data extracted from one or more packets received from another wireless communication device. The extracted audio/video data may be processed in the application processing subsystem 310 based at least in part on the communications profile. In some implementations, the encoders/decoders 322 may partition the sampled audio/video data into payloads that can be embedded within one or more packets for transmission to the sink device 360 over the WPAN connection 342. In some instances, the DSPs 324 and/or the codecs 326 may employ one or more encoding or decoding algorithms in conjunction with sampling the audio data.

The WPAN subsystem 330 may include a baseband component 332 (e.g., a Bluetooth baseband component), a firmware component 334, an A2DP component 336, and a physical layer (PHY) component 338. The baseband component 332 and the firmware component 334 may be used to generate baseband signals for constructing and deconstructing data frames based on the Bluetooth, BLE protocol, or IEEE 802.11 protocols. The baseband component 332 and the firmware component 334 may also be used to generate carrier signals for up-converting baseband signals during data transmissions and for down-converting received data signals to baseband. The A2DP component 336 may be used to control or manage an A2DP link between the wireless communication device 300 and the sink device 360. Specifically, when the WPAN subsystem 330 is in a receive mode, the PHY component 338 can be used to receive, demodulate, and down-convert data packets received over the WPAN connection 342, and to forward the data packets to the application processing subsystem 310. When the WPAN subsystem 330 is in a transmit mode, the PHY component 338 can be used to encapsulate data provided from the upper layers into one or more frames or packets for transmission to the sink device 360 over the WPAN connection 342.

As indicated above, FIG. 3 is provided as an example. Other examples may differ from what is described with regard to FIG. 3.

Figure 4:
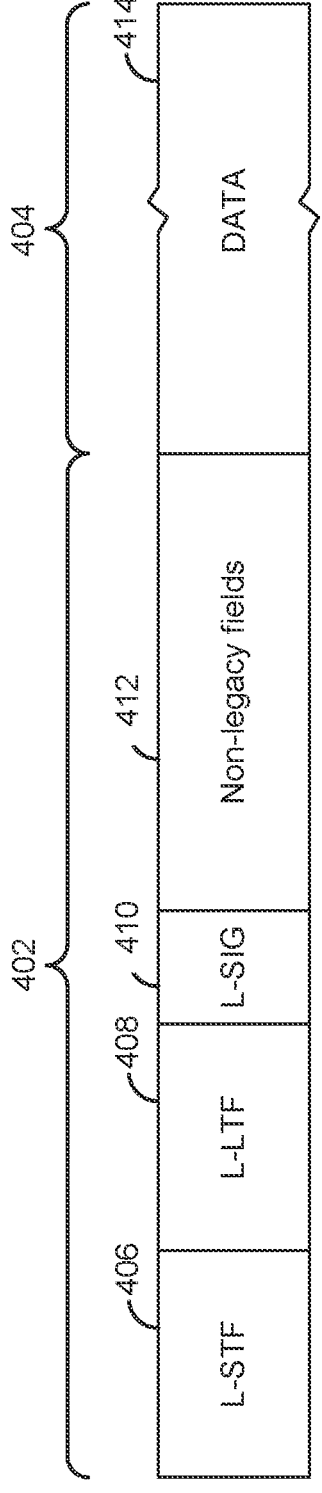
FIG. 4 shows an example protocol data unit (PDU) usable for wireless communication between a wireless access point (AP) and one or more wireless stations.

FIG. 4 is a diagram illustrating an example 400 of Wi-Fi communication, in accordance with the present disclosure.

In some aspects, the central device and the peripheral devices may communicate using Wi-Fi, such as by implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The central device may operate as a wireless AP (e.g., using WLAN controller 250) and the peripheral devices may operate as STAs. Each of the STAs also may be referred to as a mobile station (MS), a mobile device, a mobile handset, a wireless handset, an access terminal, a UE, a subscriber station (SS), or a subscriber unit, among other examples. The STAs may represent various devices such as mobile phones, personal digital assistant (PDAs), other handheld devices, netbooks, notebook computers, tablet computers, laptops, chromebooks, XR headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs in the network are able to communicate with one another via the AP.

A single AP and an associated set of STAs may be referred to as a basic service set (BSS), which is managed by the respective AP. The AP may cover a basic service area (BSA).

The BSS may be identified or indicated to users by a service set identifier (SSID), as well as to other devices by a basic service set identifier (BSSID), which may be a medium access control (MAC) address of the AP. The AP may periodically broadcast beacon frames ("beacons") including the BSSID to enable any STAs within wireless range of the AP to "associate" or re-associate with the AP to establish a respective communication link (hereinafter also referred to as a "Wi-Fi link"), or to maintain a communication link, with the AP. For example, the beacons can include an identification or indication of a primary channel used by the respective AP as well as a timing synchronization function for establishing or maintaining timing synchronization with the AP. The AP may provide access to external networks to various STAs in the WLAN via respective communication links.

The AP and STAs may function and communicate (via the respective communication links) according to one or more of the IEEE 802.11 family of wireless communication protocol standards. These standards define the WLAN radio and baseband protocols for the PHY and MAC layers. The AP and STAs transmit and receive wireless communications (hereinafter also referred to as "Wi-Fi communications" or "wireless packets") to and from one another in the form of PHY protocol data units (PPDUs). The APs and STAs may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the AP and STAs described herein also may communicate in other frequency bands, such as the 5.9 GHz and the 6 GHZ bands, which may support both licensed and unlicensed communications. The AP and STAs also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4 GHZ, 5 GHZ or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

FIG. 4 shows an example PDU 400 usable for wireless communication between a wireless AP and one or more wireless STAs. For example, the PDU 400 can be configured as a PPDU. As shown, the PDU 400 includes a PHY preamble 402 and a PHY payload 404. For example, the preamble 402 may include a legacy portion that itself includes a legacy short training field (L-STF) 406, which may consist of two symbols, a legacy long training field (L-LTF) 408, which may consist of two symbols, and a legacy signal field (L-SIG) 410, which may consist of two symbols. The legacy portion of the preamble 402 may be configured according to the IEEE 802.11a wireless communication protocol standard. The preamble 402 also may include a non-legacy portion including one or more non-legacy fields 412, for example, conforming to one or more of the IEEE 802.11 family of wireless communication protocol standards.

The L-STF 406 generally enables a receiving device to perform coarse timing and frequency tracking and automatic gain control (AGC). The L-LTF 408 generally enables a receiving device to perform fine timing and frequency tracking and also to perform an initial estimate of the wireless channel. The L-SIG 410 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 406, the L-LTF 408 and the L-SIG 410, may be modulated according to a binary phase shift keying (BPSK) modulation scheme. The payload 404 may be modulated according to a BPSK modulation scheme, a quadrature BPSK (Q-BPSK) modulation scheme, a quadrature amplitude modulation (QAM) modulation scheme, or another appropriate modulation scheme. The payload 404 may include a PSDU including a data field (DATA) 414 that, in turn, may carry higher layer data, for example, in the form of MAC protocol data units (MPDUs) or an aggregated MPDU (A-MPDU).

As indicated above, FIG. 4 is provided as an example. Other examples may differ from what is described with regard to FIG. 4.

Figure 5:
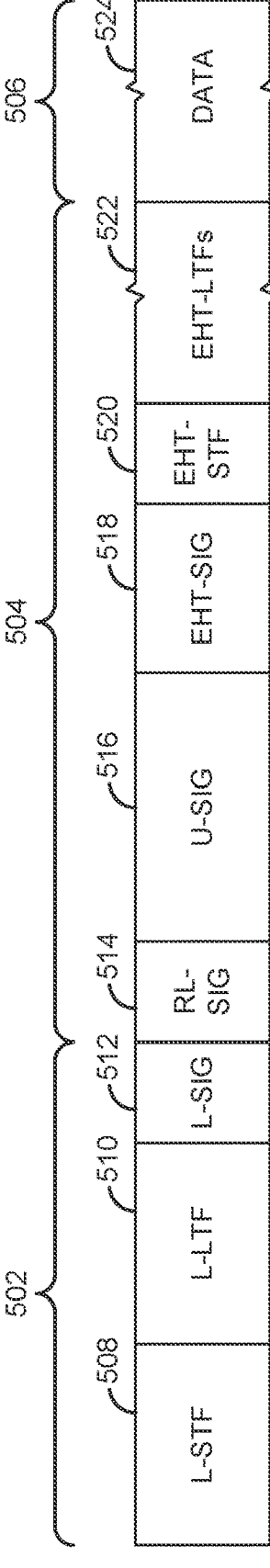
FIG. 5 shows an example physical layer PDU usable for wireless communication between a wireless AP and one or more wireless stations, in accordance with the present disclosure.

FIG. 5 shows an example PPDU 500 usable for wireless communication between a wireless AP and one or more wireless STAs, in accordance with the present disclosure.

The PPDU 500 may be used for single user orthogonal frequency-division multiple access (OFDMA) or multi-user multiple-input multiple-output (MU-MIMO) transmissions. The PPDU 500 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 500 includes a PHY preamble including a legacy portion 502 and a non-legacy portion 504. The PPDU 500 may further include a PHY payload 506 after the preamble, for example, in the form of a PSDU including a data field 524.

The legacy portion 502 of the preamble includes an L-STF 508, an L-LTF 510, and an L-SIG 512. The non-legacy portion 504 of the preamble includes a repetition of L-SIG (RL-SIG) 514 and multiple wireless communication protocol version-dependent signal fields after RL-SIG 514. For example, the non-legacy portion 504 may include a universal signal field 516 (referred to herein as "U-SIG 516") and an EHT signal field 518 (referred to herein as "EHT-SIG 518"). The presence of RL-SIG 514 and U-SIG 516 may indicate to EHT- or later version-compliant STAs 104 that the PPDU 500 is an EHT PPDU or a PPDU conforming to any later (post-EHT) version of a new wireless communication protocol conforming to a future IEEE 802.11 wireless communication protocol standard. One or both of U-SIG 516 and EHT-SIG 518 may be structured as, and carry version-dependent information for, other wireless communication protocol versions associated with amendments to the IEEE family of standards beyond EHT. For example, U-SIG 516 may be used by a receiving device to interpret bits in one or more of EHT-SIG 518 or the data field 524. Like L-STF 508, L-LTF 510, and L-SIG 512, the information in U-SIG 516 and EHT-SIG 518 may be duplicated and transmitted in each of the component 20 MHz channels in instances involving the use of a bonded channel.

The non-legacy portion 504 further includes an additional short training field 520 (referred to herein as "EHT-STF 520," although it may be structured as, and carry version-dependent information for, other wireless communication protocol versions beyond EHT) and one or more additional long training fields 522 (referred to herein as "EHT-LTFs 522," although they may be structured as, and carry version-dependent information for, other wireless communication protocol versions beyond EHT). EHT-STF 520 may be used for timing and frequency tracking and AGC, and EHT-LTF 522 may be used for more refined channel estimation.

EHT-SIG 518 may be used by an AP to identify and inform one or multiple STAs that the AP has scheduled uplink (UL) or downlink (DL) resources for them. EHT-SIG 518 may be decoded by each compatible STA 104 served by the AP 102. EHT-SIG 518 may generally be used by a receiving device to interpret bits in the data field 524. For example, EHT-SIG 518 may include RU allocation information, spatial stream configuration information, and per-user (for example, STA-specific) signaling information. Each EHT-SIG 518 may include a common field and at least one user-specific field. In the context of OFDMA, the common field can indicate RU distributions to multiple STAs, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs and carry STA-specific scheduling information such as user-specific modulation and coding scheme (MCS) values and user-specific RU allocation information. Such information enables the respective STAs to identify and decode corresponding RUs in the associated data field 524.

In some wireless communications environments, Extremely High Throughput (EHT) systems or other systems compliant with future generations of the IEEE 802.11 family of wireless communication protocol standards may provide additional capabilities over other previous systems (for example, High Efficiency (HE) systems or other legacy systems). EHT and newer wireless communication protocols may support flexible operating bandwidth enhancements at APs and STAs, such as broadened operating bandwidths relative to legacy operating bandwidths or more granular operation relative to legacy operation. For example, an EHT system may allow communications spanning operating bandwidths of 20 MHZ, 40 MHZ, 80 MHZ, 160 MHz, 240 MHz and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device operates in a contiguous 320 MHz bandwidth mode or a 160+160 MHz bandwidth mode. Signals for transmission may be generated by two different transmit chains of the device each having a bandwidth of 160 MHZ (and each coupled to a different power amplifier). In some other examples, signals for transmission may be generated by four or more different transmit chains of the device, each having a bandwidth of 80 MHZ.

In some other examples, the wireless communication device may operate in a contiguous 240 MHz bandwidth mode, or a noncontiguous 160+80 MHz bandwidth mode. In some examples, the signals for transmission may be generated by three different transmit chains of the device, each having a bandwidth of 80 MHZ. In some other examples, the 240 MHz/160+80 MHz bandwidth modes may also be formed by puncturing 320/160+160 MHz bandwidth modes with one or more 80 MHZ subchannels. For example, signals for transmission may be generated by two different transmit chains of the device each having a bandwidth of 160 MHZ with one of the transmit chains outputting a signal having an 80 MHz subchannel punctured therein.

The operating bandwidth also may accommodate concurrent operation on other unlicensed frequency bands (such as the 6 GHz band) and a portion of spectrum that includes frequency bands traditionally used by Wi-Fi technology. In noncontiguous examples, the operating bandwidth may span one or more disparate sub-channel sets. For example, the 320 MHz bandwidth may be contiguous and located in the same 6 GHz band, or noncontiguous and located in different bands (such as partly in the 5 GHZ band and partly in the 6 GHz band).

In some examples, operability enhancements associated with EHT and newer generations of the IEEE 802.11 family of wireless communication protocols, and in particular operation at an increased bandwidth, may include refinements to carrier sensing and signal reporting mechanisms. Such techniques may include modifications to existing rules, structure, or signaling implemented for legacy systems.

Transmitting and receiving devices may support the use of various MCSs to transmit and receive data so as to optimally take advantage of wireless channel conditions, for example, to increase throughput, reduce latency, or enforce various quality of service (QOS) parameters. For example, existing technology supports the use of up to 1024-QAM, where a modulated symbol carries 10 bits. To further improve peak data rate, 4096-QAM (also referred to as "4 k QAM"), which enables a modulated symbol to carry 12 bits, also may be implemented. 4096-QAM may enable a 20% increase in data rate compared to 1024-QAM given the same coding rate, thereby allowing users to obtain higher transmission efficiency.

As indicated above, FIG. 5 is provided as an example. Other examples may differ from what is described with regard to FIG. 5.

FIG. 6 is a diagram illustrating examples 600 and 602 of TWT information, in accordance with the present disclosure.

STAs may use TWT scheduling to conserve battery power and to avoid uplink access contention. TWT allows a central device, such as an AP, to manage activity in the BSS in order to minimize contention between the STAs and to reduce the required amount of time that a STA utilizing a power management mode needs to be awake. The AP may schedule TWT time durations during which a STA is awake and/or has uplink access to the wireless network. The STA is otherwise asleep and/or does not have uplink access to the network.

The AP may transmit TWT information such that STAs may follow a TWT schedule. FIG. 6 shows examples 600 and 602 of TWT information. Example 600 shows a TWT element format that includes an element identifier (ID) 604, a length 606, control information 608, and TWT parameter information 610 that is variable. Example 602 shows a TWT information element (IE) control field that includes a null data packet (NDP) paging indicator 612, a responder power management (PM) mode 614, a negotiation type 616, an indicator of TWT information frame disabled 618, a wake duration unit 620, and a reserved field 622. The negotiation type is set to 1 for broadcast TWT. The negotiation type is set to 0 for individual TWT. The AP (or SAP) may advertise Broadcast TWT requesting its associated clients to join an existing TWT session.

As indicated above, FIG. 6 is provided as an example. Other examples may differ from what is described with regard to FIG. 6.

Figure 7:
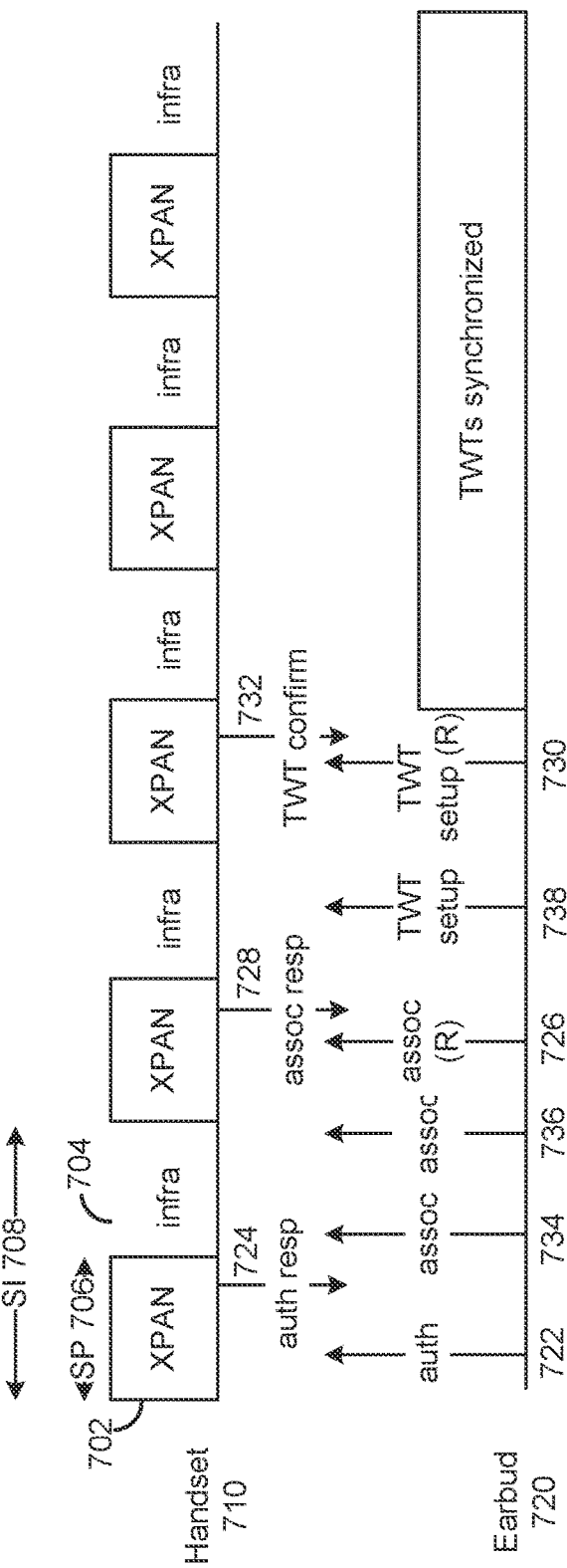
FIG. 7 is a diagram illustrating an example of extended PAN (XPAN) association, in accordance with the present disclosure.

FIG. 7 is a diagram illustrating an example 700 of XPAN association, in accordance with the present disclosure.

XPAN communications may involve communications between a central device, such as a handset (e.g., UE, XPAN SAP), and peripheral devices (e.g., earbuds) during XPAN time windows and communications between the handset and another device (e.g., AP, network entity) during infra time windows. When the handset forms a multi-channel concurrency (MCC) with an infra interface, XPAN and infra link grants are timeshared. Example 700 shows XPAN time windows 702 and infra time windows 704. An XPAN time window 702 may be the length of an SP 706, and the length of an XPAN time window and an infra time window may be an SI 708.

An earbud 720 may seek to setup or synchronize a TWT schedule such that the earbud 720 can transmit data to or receive data (in frames) from a handset 710 during TWT awake times. To synchronize the TWTs, the earbud 720 transmits an authentication message 722 and receives an authentication response 724. The earbud 720 is then able to associate with the handset 710 by transmitting an association message 726 and receiving an association response 728 if the association message 726 is received (R) by the handset 710. The earbud 720 then transmits a TWT setup message 730 and receives a TWT confirmation message 732 if the TWT setup message 730 is received. The TWTs are then synchronized.

In some XPAN techniques, the handset 710 does not indicate the availability of XPAN time windows 702, and no unicast frames are to be triggered from the earbud 720 during the infra time windows 704. If the earbud 720 transmits a message during an infra time window, when the handset 710 can be communicating with another device (e.g., AP, gNB), the message is not received by the handset 710 and the message is wasted. For example, association message 734 and association message 736 are transmitted during an infra time window and are thus wasted. TWT setup message 738 is also transmitted during an infra time window and is wasted. Wasted messages waste power and signaling resources.

Some XPAN techniques may also use a CTS2Self message for traffic shaping prior to TWT session setup between a handset and earbuds. The earbud 720 (of the earbuds) may transmit a request to send (RTS) message in order for the handset to send a clear to send (CTS) message that silences nearby STAs so that the sender of the RTS message is clear to transmit. A CTS2Self message involves a CTS message without an RTS message. The CTS2Self message may be a special frame where the destination address and the source address are the same. With a CTS2Self message, a maximum of 32 milliseconds (ms) can be protected. If channel grants for infra links are more than the 32 ms, the extra duration is not protected on the XPAN channel. Any earbud association or TWT setup messages during this duration would result in failures and subsequent retries, which also wastes power and signaling resources.

As indicated above, FIG. 7 is provided as an example. Other examples may differ from what is described with regard to FIG. 7.

Figure 8:
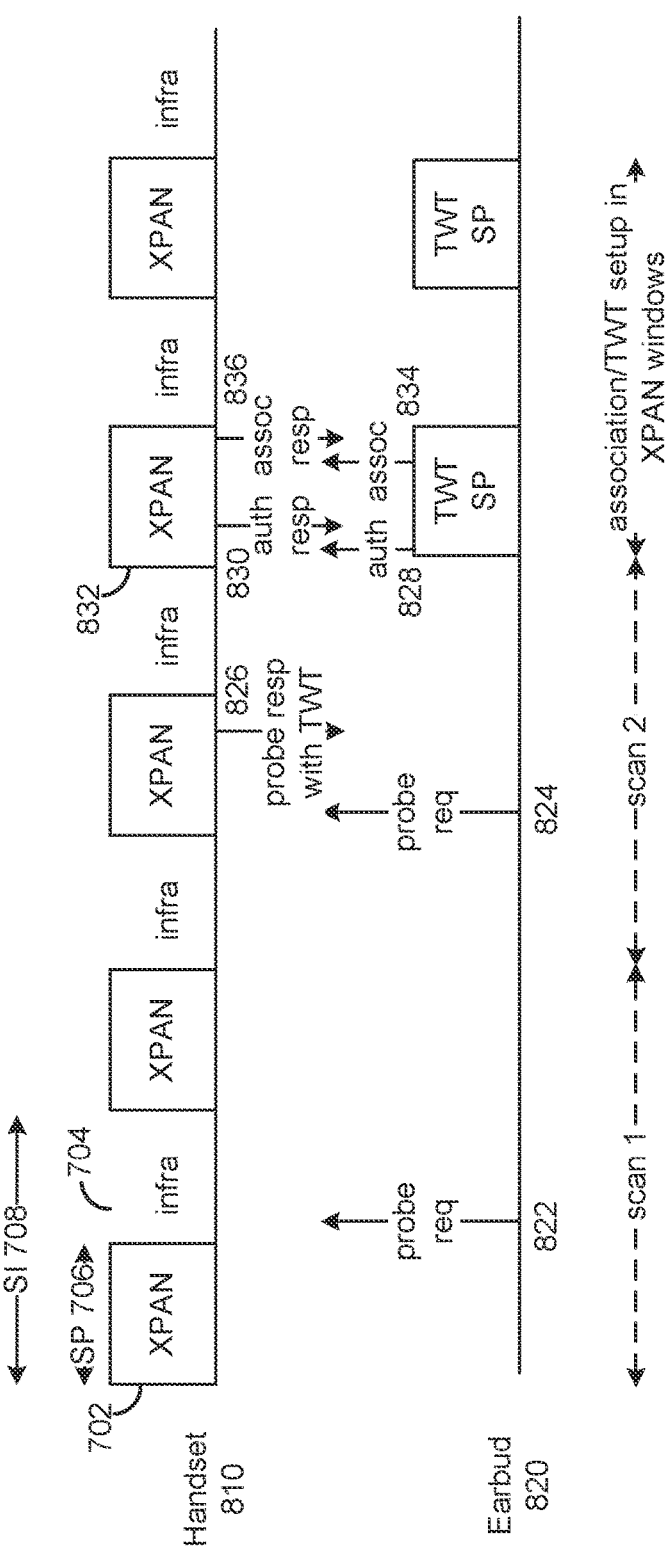
FIG. 8 is a diagram illustrating an example of using a probe response with a TWT for authentication and association, in accordance with the present disclosure.

FIG. 8 is a diagram illustrating an example 800 of using a probe response with a TWT for authentication and association, in accordance with the present disclosure.

According to various aspects described herein, a central device of an XPAN, such as a handset 810 (e.g., wireless communication device 200, UE, XPAN SAP), may indicate the availability or unavailability of TWT SPs/XPAN time windows to a peripheral device, such as an earbud 820 (e.g., wireless communication device 200) using broadcast TWTs in beacons or probe responses such that unicast earbud transmissions to the handset 810 are during the XPAN time windows. The handset 810 may be in active mode operating in MCC, which supports broadcast TWT. The handset 810 may indicate, during an XPAN time window in a beacon or a probe response, TWT information. The TWT information may indicate a TWT SP and a TWT SI. That is, the earbuds, upon detecting the handset 810 from beacons or probe responses through scanning in an unassociated state, may restrict the association and TWT setup to TWT SPs/XPAN time windows. In this way, fewer retry messages are wasted and connection latency is reduced.

Example 800 shows the use of a probe request and a probe response to provide the TWT information. The earbud 820 may transmit a first probe request 822 while in an unassociated state. The first probe request 822 is during an infra frame (unknown to the earbud 820) and thus there is no probe response from the handset. Multiple probe requests may be sent, as the first probe request 822 may fall outside of an XPAN time window. The earbud 820 may transmit a second probe request 824 that happens to be in an XPAN time window. The handset 810 may transmit a probe response 826 that includes a TWT. The TWT may indicate the XPAN time windows 702 during which communication with the handset 810 is allowed. In some aspects, the TWT may indicate the SP 706 and the SI 708. The earbud 820, scanning for probe responses, may receive the probe response 826 with the TWT. The TWT SPs may align with the XPAN time windows 702.

The earbud 820 may use the TWT for authentication and association during the XPAN time windows 702 to synchronize its TWT with the handset 810. For example, the earbud 820 may transmit an authentication message 828 and receive an authentication response 830 during an XPAN time window 832, based at least in part on the TWT received with the probe response 826. The earbud 820 may transmit an association message 834 and receive an association response 836 during the XPAN time window 832 (or the next XPAN time window), based at least in part on the TWT received with the probe response 826. The earbud 820 (and its paired earbud) may have TWTs synchronized with the handset 810. In some aspects, future communications between the handset 810 and the earbud 820 may occur during a TWT SP and/or an XPAN time window (and not during an infra time window). Signaling resources are conserved and latency is reduced because the quantity of retries in MCC is reduced.

The probability of earbud connection may increase as earbuds may ensure that connection frames are sent only during the SP advertised by the handset 810 in probe responses. Furthermore, the use of CTS2Self messages can be avoided. This increases the channel grant time for the infra link before TWT sessions and enables the reuse of the Wi-Fi medium on the XPAN channel. The grant time for infra links may also be increased based at least in part on the XPAN channel usage.

As indicated above, FIG. 8 is provided as an example. Other examples may differ from what is described with regard to FIG. 8.

Figure 9:
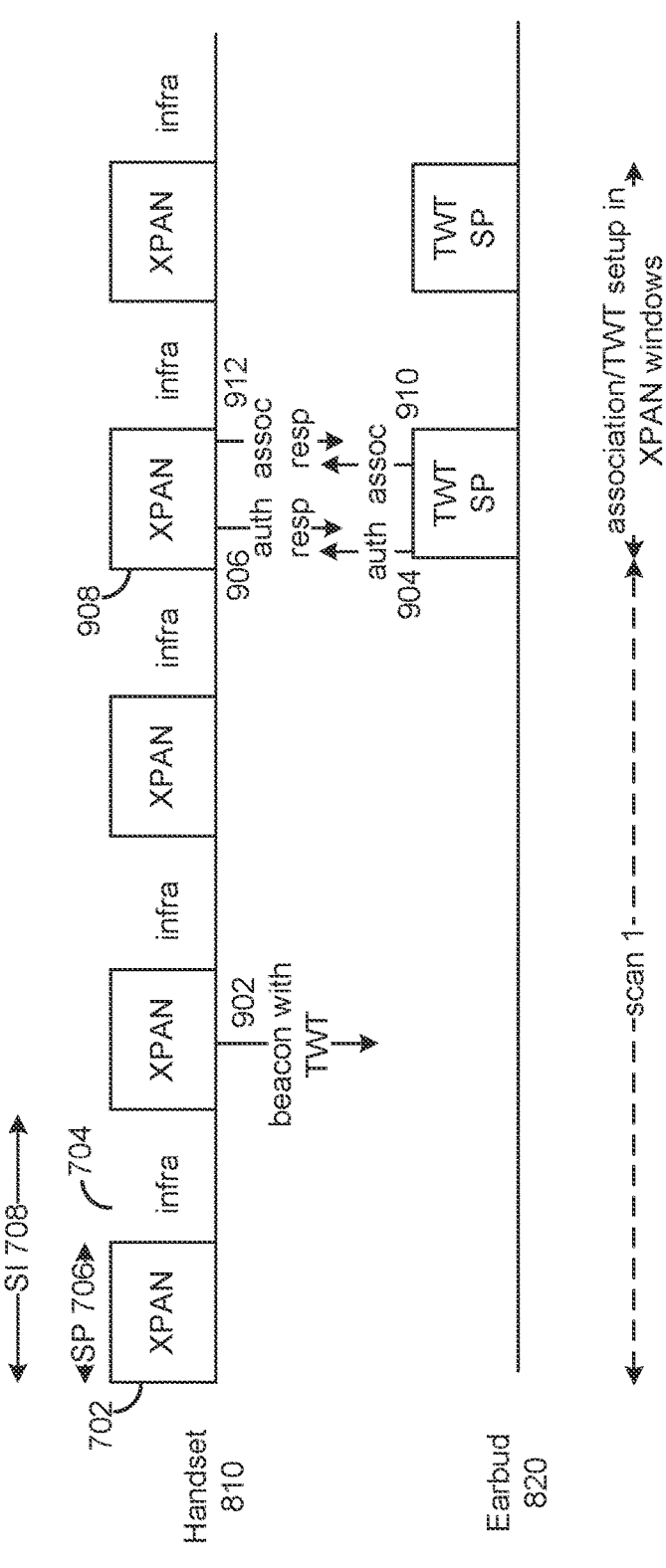
FIG. 9 is a diagram illustrating an example of using a beacon with a TWT for authentication and association, in accordance with the present disclosure.

FIG. 9 is a diagram illustrating an example 900 of using a beacon with a TWT for authentication and association, in accordance with the present disclosure.

In some aspects, the handset 810 may advertise a TWT by broadcasting a beacon with a TWT, such that unicast earbud transmissions to the handset 810 are during the TWT SPs/ XPAN time windows. Example 900 shows that the handset 810 may indicate TWT information in a beacon 902 during an XPAN time window (and not during an infra time window). The TWT information may indicate a TWT SP and a TWT SI. The earbud 820 may be scanning for beacons in an unassociated state. The earbud 820 may receive the beacon with the TWT and use the TWT to restrict the association and TWT setup to TWT SPs/XPAN time windows. In this way, fewer retry messages are wasted and connection latency is reduced.

The earbud 820 may use the TWT for authentication and association during the XPAN time windows 702 to synchronize its TWT with the handset 810. For example, the earbud 820 may transmit an authentication message 904 and receive an authentication response 906 during an XPAN time window 908, based at least in part on the TWT received with the beacon 902. The earbud 820 may transmit an association message 910 and receive an association response 912 during the XPAN time window 908 (or the next XPAN time window), based at least in part on the TWT received with the probe beacon 902. The earbud 820 (and its paired earbud) may have TWTs synchronized with the handset 810. In some aspects, future communications between the handset 810 and the earbud 820 may occur during a TWT SP and/or an XPAN time window (and not during an infra time window). Signaling resources are conserved and latency is reduced, as explained above in connection with FIG. 8.

Since broadcast TWTs are advertised in beacons, the probability of handset detection may increase based at least in part on when passive scans are performed by the earbud 820. Passive scans may include scans that occur for a duration of time and according to scan intervals. The broadcast TWTs may be advertised by the handset 810 in active mode and not in low power mode, as a Bluetooth host may ensure that connection/TWT sessions are established only in an XPAN active mode.

As indicated above, FIG. 9 is provided as an example. Other examples may differ from what is described with regard to FIG. 9.

Figure 10:
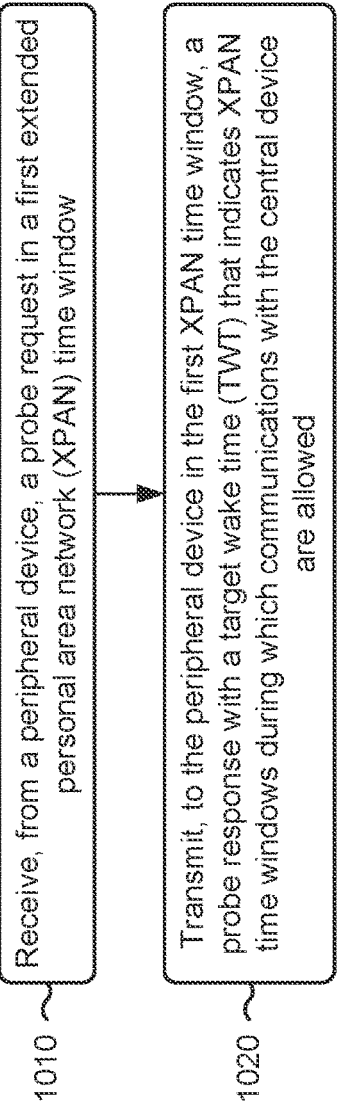
FIG. 10 is a diagram illustrating an example process performed, for example, by a central device, in accordance with the present disclosure.

FIG. 10 is a diagram illustrating an example process 1000 performed, for example, by a central device, in accordance with the present disclosure. Example process 1000 is an example where the central device (e.g., UE, XPAN SAP, handset 810) performs operations associated with using a TWT in a probe response for authentication and association for TWT synchronization.

As shown in FIG. 10, in some aspects, process 1000 may include receiving, from a peripheral device, a probe request in a first XPAN time window (block 1010). For example, the central device (e.g., using reception component 1402 and/or communication manager 1406, depicted in FIG. 14) may receive, from a peripheral device, a probe request in a first XPAN time window, as described above. The first XPAN time window may be an available XPAN window. The second XPAN time window may be one of further XPAN windows.

As further shown in FIG. 10, in some aspects, process 1000 may include transmitting, to the peripheral device in the first XPAN time window, a probe response with a TWT that indicates XPAN time windows during which communications with the central device are allowed (block 1020). For example, the central device (e.g., using transmission component 1404 and/or communication manager 1406, depicted in FIG. 14) may transmit, to the peripheral device in the first XPAN time window, a probe response with a TWT that indicates XPAN time windows during which communications with the central device are allowed, as described above.

Process 1000 may include additional aspects, such as any single aspect or any combination of aspects described below and/or in connection with one or more other processes described elsewhere herein.

In a first aspect, process 1000 includes receiving an authentication message and an association request in a second XPAN time window, and transmitting, based at least in part on the TWT, an association response in the second XPAN time window and not in an infra time window.

In a second aspect, alone or in combination with the first aspect, the central device is operating using MCC where XPAN links and infra links are timeshared.

In a third aspect, alone or in combination with one or more of the first and second aspects, the TWT indicates an SP and/or an SI for XPAN time windows.

In a fourth aspect, alone or in combination with one or more of the first through third aspects, process 1000 includes receiving a communication from the peripheral device during the service period.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
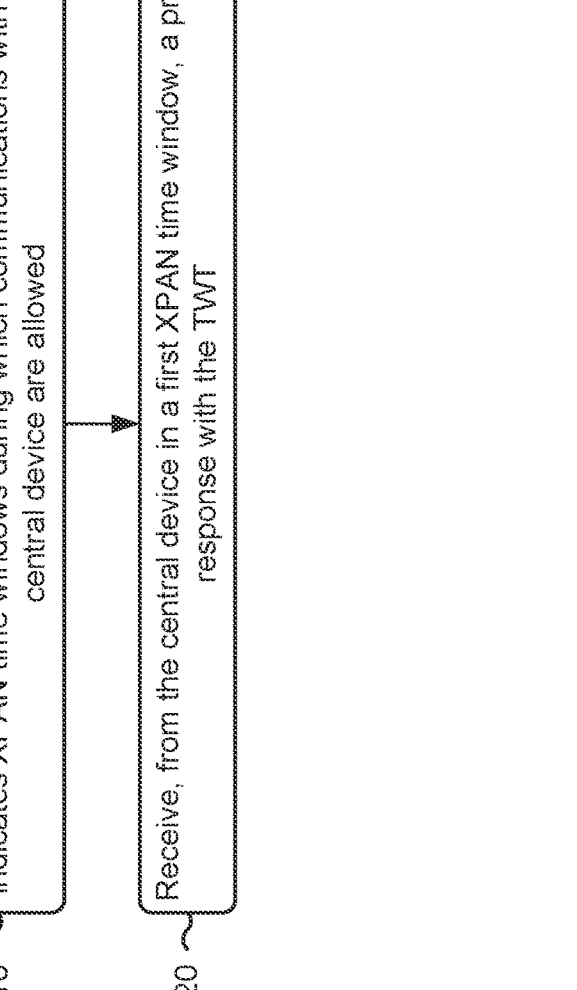
FIG. 11 is a diagram illustrating an example process performed, for example, by a peripheral device, in accordance with the present disclosure.

FIG. 11 is a diagram illustrating an example process 1100 performed, for example, by a peripheral device, in accordance with the present disclosure. Example process 1100 is an example where the peripheral device (e.g., earbud 820) performs operations associated with using a TWT in a probe response for authentication and association for TWT synchronization.

As shown in FIG. 11, in some aspects, process 1100 may include transmitting, to a central device, a probe request for a TWT that indicates XPAN time windows during which communications with the central device are allowed (block 1110). For example, the peripheral device (e.g., using transmission component 1504 and/or communication manager 1506, depicted in FIG. 15) may transmit, to a central device, a probe request for a TWT that indicates XPAN time windows during which communications with the central device are allowed, as described above.

As further shown in FIG. 11, in some aspects, process 1100 may include receiving, from the central device in a first XPAN time window, a probe response with the TWT (block 1120). For example, the peripheral device (e.g., using reception component 1502 and/or communication manager 1506, depicted in FIG. 15) may receive, from the central device in a first XPAN time window, a probe response with the TWT, as described above.

Process 1100 may include additional aspects, such as any single aspect or any combination of aspects described below and/or in connection with one or more other processes described elsewhere herein.

In a first aspect, process 1100 includes transmitting, based at least in part on the TWT, an authentication message and an association request in a second XPAN time window and not in an infra time window, and receiving an association response in the second XPAN time.

In a second aspect, alone or in combination with the first aspect, the TWT indicates an SP and/or an SI for XPAN time windows.

In a third aspect, alone or in combination with one or more of the first and second aspects, process 1100 includes transmitting a communication during the service period.

In a fourth aspect, alone or in combination with one or more of the first through third aspects, process 1100 includes transmitting authentication messages in XPAN time windows indicated by the TWT and not in infra time windows.

In a fifth aspect, alone or in combination with one or more of the first through fourth aspects, process 1100 includes transmitting association messages in XPAN time windows indicated by the TWT and not in infra time windows.

In a sixth aspect, alone or in combination with one or more of the first through fifth aspects, process 1100 includes transmitting TWT setup messages in XPAN time windows indicated by the TWT and not in infra time windows.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

FIG. 12 is a diagram illustrating an example process 1200 performed, for example, by a central device, in accordance with the present disclosure. Example process 1200 is an example where the central device (e.g., UE, XPAN SAP, handset 810) performs operations associated with using a TWT in a beacon for authentication and association for TWT synchronization.

As shown in FIG. 12, in some aspects, process 1200 may include transmitting, in a first XPAN time window and not in an infra time window, a beacon with a TWT that indicates XPAN time windows during which communications with the central device are allowed (block 1210). For example, the central device (e.g., using transmission component 1404 and/or communication manager 1406, depicted in FIG. 14) may transmit, in a first XPAN time window and not in an infra time window, a beacon with a TWT that indicates XPAN time windows during which communications with the central device are allowed, as described above.

As further shown in FIG. 12, in some aspects, process 1200 may include receiving, from a peripheral device, an authentication message and an association request in a second XPAN time window (block 1220). For example, the central device (e.g., using reception component 1402 and/or communication manager 1406, depicted in FIG. 14) may receive, from a peripheral device, an authentication message and an association request in a second XPAN time window, as described above.

As further shown in FIG. 12, in some aspects, process 1200 may include transmitting, based at least in part on the authentication message and the association request being received in the second XPAN time window, an association response to the peripheral device in the second XPAN time window and not in an infra time window (block 1230). For example, the central device (e.g., using transmission component 1404 and/or communication manager 1406, depicted in FIG. 14) may transmit, based at least in part on the authentication message and the association request being received in the second XPAN time window, an association response to the peripheral device in the second XPAN time window and not in an infra time window, as described above.

Process 1200 may include additional aspects, such as any single aspect or any combination of aspects described below and/or in connection with one or more other processes described elsewhere herein.

In a first aspect, transmitting the beacon includes broadcasting the beacon.

In a second aspect, alone or in combination with the first aspect, the TWT indicates an SP and/or an SI for XPAN time windows.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

FIG. 13 is a diagram illustrating an example process 1300 performed, for example, by a peripheral device, in accordance with the present disclosure. Example process 1300 is an example where the peripheral device (e.g., earbud 720) performs operations associated with using a TWT in a beacon for authentication and association for TWT synchronization.

As shown in FIG. 13, in some aspects, process 1300 may include receiving, from a central device in a first XPAN time window and not in an infra time window, a beacon with a TWT that indicates XPAN time windows during which communications with the central device are allowed (block 1310). For example, the peripheral device (e.g., using reception component 1502 and/or communication manager 1506, depicted in FIG. 15) may receive, from a central device in a first XPAN time window and not in an infra time window, a beacon with a TWT that indicates XPAN time windows during which communications with the central device are allowed, as described above.

As further shown in FIG. 13, in some aspects, process 1300 may include transmitting, based at least in part on the TWT, an authentication message and an association request in a second XPAN time window and not in an infra time window (block 1320). For example, the peripheral device (e.g., using transmission component 1504 and/or communication manager 1506, depicted in FIG. 15) may transmit, based at least in part on the TWT, an authentication message and an association request in a second XPAN time window and not in an infra time window, as described above.

As further shown in FIG. 13, in some aspects, process 1300 may include receiving an association response in the second XPAN time window (block 1330). For example, the peripheral device (e.g., using reception component 1502 and/or communication manager 1506, depicted in FIG. 15) may receive an association response in the second XPAN time window, as described above.

Process 1300 may include additional aspects, such as any single aspect or any combination of aspects described below and/or in connection with one or more other processes described elsewhere herein.

In a first aspect, process 1300 includes scanning for beacons based at least in part on a pattern for detecting beacons in an XPAN time window.

In a second aspect, alone or in combination with the first aspect, the TWT indicates an SP and/or an SI for XPAN time windows.

In a third aspect, alone or in combination with one or more of the first and second aspects, process 1300 includes transmitting authentication messages in XPAN time windows indicated by the TWT and not in infra time windows.

In a fourth aspect, alone or in combination with one or more of the first through third aspects, process 1300 includes transmitting association messages in XPAN time windows indicated by the TWT and not in infra time windows.

In a fifth aspect, alone or in combination with one or more of the first through fourth aspects, process 1300 includes transmitting TWT setup messages in XPAN time windows indicated by the TWT and not in infra time windows.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
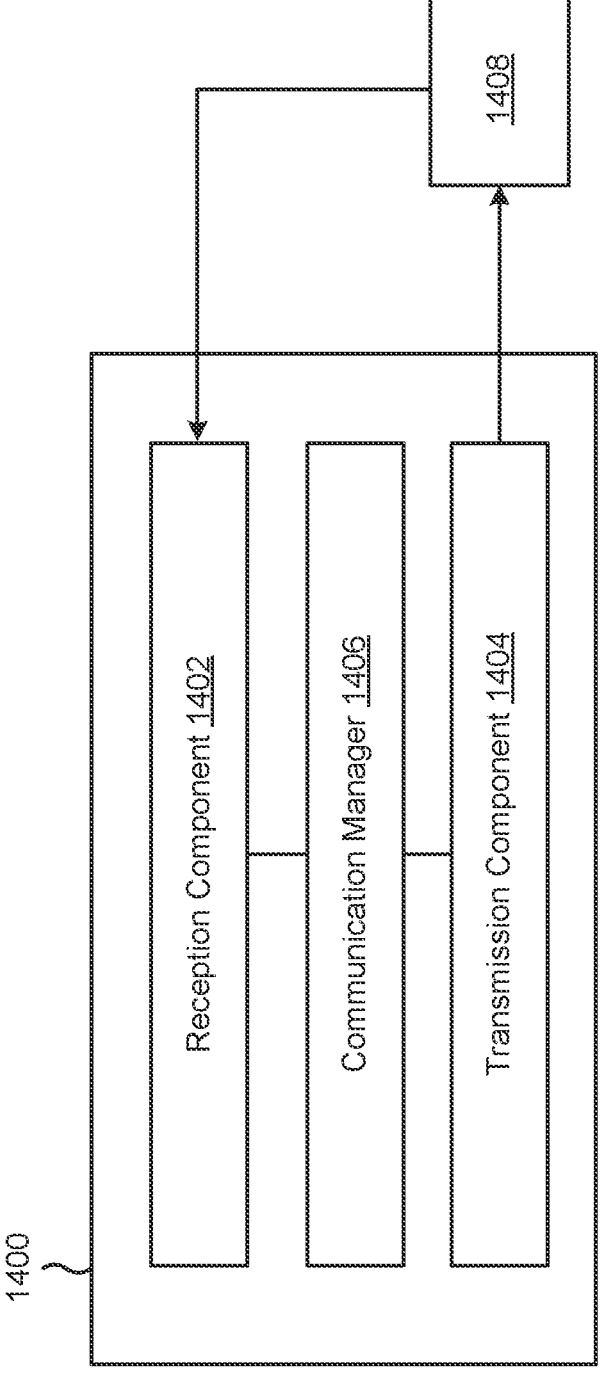
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a central device (e.g., UE, SAP, AP, handset 810), or a central device may include the apparatus 1400. In some aspects, the apparatus 1400 includes a reception component 1402, a transmission component 1404, and/or a communication manager 1406, which may be in communication with one another (for example, via one or more buses and/or one or more other components).

In some aspects, the apparatus 1400 may be configured to perform one or more operations described herein in connection with FIGS. 1-9. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the central device described in connection with FIGS. 2-3. Additionally, or alternatively, one or more components shown in FIG. 14 may be implemented within one or more components described in connection with FIGS. 2-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1408. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a multiple-input multiple-output (MIMO) detector, a receive processor, a controller/processor, a memory, or a combination thereof, of the central device described in connection with FIGS. 2-3.

The transmission component 1404 may transmit communications, such as reference signals, control information, data communications, or a combination thereof, to the apparatus 1408. In some aspects, one or more other components of the apparatus 1400 may generate communications and may provide the generated communications to the transmission component 1404 for transmission to the apparatus 1408. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1408. In some aspects, the transmission component 1404 may include one or more antennas, a modem, a modulator, a transmit MIMO processor, a transmit processor, a controller/processor, a memory, or a combination thereof, of the central device described in connection with FIGS. 2-3. In some aspects, the transmission component 1404 may be co-located with the reception component 1402 in a transceiver.

The communication manager 1406 may support operations of the reception component 1402 and/or the transmission component 1404. For example, the communication manager 1406 may receive information associated with configuring reception of communications by the reception component 1402 and/or transmission of communications by the transmission component 1404. Additionally, or alternatively, the communication manager 1406 may generate and/or provide control information to the reception component 1402 and/or the transmission component 1404 to control reception and/or transmission of communications.

In some aspects, the reception component 1402 may receive, from a peripheral device, a probe request in a first XPAN time window. The transmission component 1404 may transmit, to the peripheral device in the first XPAN time window, a probe response with a TWT that indicates XPAN time windows during which communications with the central device are allowed.

The reception component 1402 may receive an authentication message and an association request in a second XPAN time window. The transmission component 1404 may transmit, based at least in part on the TWT, an association response in the second XPAN time window and not in an infra time window. The reception component 1402 may receive a communication from the peripheral device during a TWT SP.

In some aspects, the transmission component 1404 may transmit, in a first XPAN time window and not in an infra time window, a beacon with a TWT that indicates XPAN time windows during which communications with the central device are allowed. The reception component 1402 may receive, from a peripheral device, an authentication message and an association request in a second XPAN time window. The transmission component 1404 may transmit, based at least in part on the authentication message and the association request being received in the second XPAN time window, an association response to the peripheral device in the second XPAN time window and not in an infra time window.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
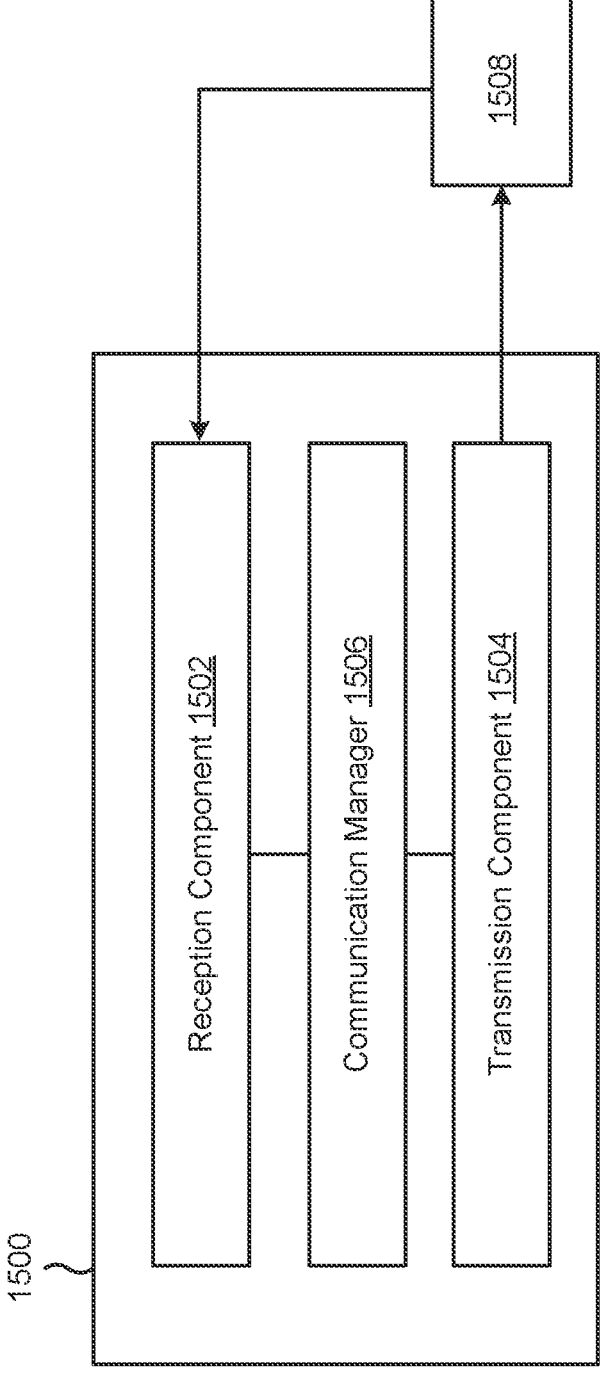
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a peripheral device (e.g., earbud 820), or a peripheral device may include the apparatus 1500. In some aspects, the apparatus 1500 includes a reception component 1502, a transmission component 1504, and/or a communication manager 1506, which may be in communication with one another (for example, via one or more buses and/or one or more other components).

In some aspects, the apparatus 1500 may be configured to perform one or more operations described herein in connection with FIGS. 1-9. Additionally, or alternatively, the apparatus 1500 may be configured to perform one or more processes described herein, such as process 1100 of FIG. 11, process 1300 of FIG. 13, or a combination thereof. In some aspects, the apparatus 1500 and/or one or more components shown in FIG. 15 may include one or more components of the peripheral device described in connection with FIGS. 2-3. Additionally, or alternatively, one or more components shown in FIG. 15 may be implemented within one or more components described in connection with FIGS. 2-3. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1508. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the peripheral device described in connection with FIGS. 2-3.

The transmission component 1504 may transmit communications, such as reference signals, control information, data communications, or a combination thereof, to the apparatus 1508. In some aspects, one or more other components of the apparatus 1500 may generate communications and may provide the generated communications to the transmission component 1504 for transmission to the apparatus 1508. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1508. In some aspects, the transmission component 1504 may include one or more antennas, a modem, a modulator, a transmit MIMO processor, a transmit processor, a controller/ processor, a memory, or a combination thereof, of the peripheral device described in connection with FIGS. 2-3. In some aspects, the transmission component 1504 may be co-located with the reception component 1502 in a transceiver.

The communication manager 1506 may support operations of the reception component 1502 and/or the transmission component 1504. For example, the communication manager 1506 may receive information associated with configuring reception of communications by the reception component 1502 and/or transmission of communications by the transmission component 1504. Additionally, or alternatively, the communication manager 1506 may generate and/or provide control information to the reception component 1502 and/or the transmission component 1504 to control reception and/or transmission of communications.

In some aspects, the transmission component 1504 may transmit, to a central device, a probe request for a TWT that indicates XPAN time windows during which communications with the central device are allowed. The reception component 1502 may receive, from the central device in a first XPAN time window, a probe response with the TWT.

The transmission component 1504 may transmit, based at least in part on the TWT, an authentication message and an association request in a second XPAN time window and not in an infra time window. The reception component 1502 may receive an association response in the second XPAN time. The transmission component 1504 may transmit a communication during a TWT SP.

In some aspects, the reception component 1502 may receive, from a central device in a first XPAN time window and not in an infra time window, a beacon with a TWT that indicates XPAN time windows during which communications with the central device are allowed. The transmission component 1504 may transmit, based at least in part on the TWT, an authentication message and an association request in a second XPAN time window and not in an infra time window. The reception component 1502 may receive an association response in the second XPAN time window.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a central device, comprising: receiving, from a peripheral device, a probe request in a first extended personal area network (XPAN) time window; and transmitting, to the peripheral device in the first XPAN time window, a probe response with a target wake time (TWT) that indicates XPAN time windows during which communications with the central device are allowed.

Aspect 2: The method of Aspect 1, further comprising: receiving an authentication message and an association request in a second XPAN time window; and transmitting, based at least in part on the TWT, an association response in the second XPAN time window and not in an infra time window.

Aspect 3: The method of any of Aspects 1-2, wherein the central device is operating using multi-channel concurrency where XPAN links and infra links are timeshared.

Aspect 4: The method of any of Aspects 1-3, wherein the TWT indicates a service period and a service interval for XPAN time windows.

Aspect 5: The method of Aspect 4, further comprising receiving a communication from the peripheral device during the service period.

Aspect 6: A method of wireless communication performed by a peripheral device, comprising: transmitting, to a central device, a probe request for a target wake time (TWT) that indicates extended personal area network (XPAN) time windows during which communications with the central device are allowed; and receiving, from the central device in a first XPAN time window, a probe response with the TWT.

Aspect 7: The method of Aspect 6, further comprising: transmitting, based at least in part on the TWT, an authentication message and an association request in a second XPAN time window and not in an infra time window; and receiving an association response in the second XPAN time.

Aspect 8: The method of any of Aspects 6-7, wherein the TWT indicates a service period and a service interval for XPAN time windows.

Aspect 9: The method of Aspect 8, further comprising transmitting a communication during the service period.

Aspect 10: The method of any of Aspects 6-9, further comprising transmitting authentication messages in XPAN time windows indicated by the TWT and not in infra time windows.

Aspect 11: The method of any of Aspects 6-10, further comprising transmitting association messages in XPAN time windows indicated by the TWT and not in infra time windows.

Aspect 12: The method of any of Aspects 6-11, further comprising transmitting TWT setup messages in XPAN time windows indicated by the TWT and not in infra time windows.

Aspect 13: A method of wireless communication performed by a central device, comprising: transmitting, in a first extended personal area network (XPAN) time window and not in an infra time window, a beacon with a target wake time (TWT) that indicates XPAN time windows during which communications with the central device are allowed; receiving, from a peripheral device, an authentication message and an association request in a second XPAN time window; and transmitting, based at least in part on the authentication message and the association request being received in the second XPAN time window, an association response to the peripheral device in the second XPAN time window and not in an infra time window.

Aspect 14: The method of Aspect 13, wherein transmitting the beacon includes broadcasting the beacon.

Aspect 15: The method of any of Aspects 13-14, wherein the TWT indicates a service period and a service interval for XPAN time windows.

Aspect 16: A method of wireless communication performed by a peripheral device, comprising: receiving, from a central device in a first extended personal area network (XPAN) time window and not in an infra time window, a beacon with a target wake time (TWT) that indicates XPAN time windows during which communications with the central device are allowed; transmitting, based at least in part on the TWT, an authentication message and an association request in a second XPAN time window and not in an infra time window; and receiving an association response in the second XPAN time window.

Aspect 17: The method of Aspect 16, further comprising scanning for beacons based at least in part on a pattern for detecting beacons in an XPAN time window.

Aspect 18: The method of any of Aspects 16-17, wherein the TWT indicates a service period and a service interval for XPAN time windows.

Aspect 19: The method of any of Aspects 16-18, further comprising transmitting authentication messages in XPAN time windows indicated by the TWT and not in infra time windows.

Aspect 20: The method of any of Aspects 16-19, further comprising transmitting association messages in XPAN time windows indicated by the TWT and not in infra time windows.

Aspect 21: The method of any of Aspects 16-20, further comprising transmitting TWT setup messages in XPAN time windows indicated by the TWT and not in infra time windows.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A central device for wireless communication, comprising:

one or more memories; and one or more processors coupled to the one or more memories, the one or more processors individually or collectively configured to:

receive, from an access point, a communication comprising an indication that the central device join an existing target wake time session;

receive, from a peripheral device, a probe request in a first extended personal area network (XPAN) time window; and transmit, to the peripheral device in the first XPAN time window, a probe response with a target wake time (TWT) that indicates XPAN time windows during which communications between the peripheral device and the central device are allowed, wherein the existing target wake time session comprises the XPAN time windows and a plurality of infra time windows, the plurality of infra time windows defining time periods during which communications between the access point and the central device are allowed, and wherein a grant for time periods for one or more respective infra time windows is based on an XPAN channel usage.

2. The central device of claim 1, wherein the one or more processors are individually or collectively configured to:

receive an authentication message and an association request in a second XPAN time window; and transmit, based at least in part on the TWT, an association response in the second XPAN time window and not in an infra time window.

3. The central device of claim 1, wherein the central device is operating using multi-channel concurrency where XPAN links and infra links are timeshared.

4. The central device of claim 1, wherein the TWT indicates a service period and a service interval for the XPAN time windows.

5. The central device of claim 4, wherein the one or more processors are individually or collectively configured to receive a communication from the peripheral device during the service period.

6. A peripheral device for wireless communication, comprising:

one or more memories; and one or more processors coupled to the one or more memories, the one or more processors individually or collectively configured to:

transmit, to a central device, a probe request for a target wake time (TWT) that indicates extended personal area network (XPAN) time windows during which communications between the peripheral device and the central device are allowed; and receive, from the central device in a first XPAN time window, a probe response with the TWT, wherein the TWT is based at least in part on an existing target wake time session communicated to the central device, wherein the existing target wake time session comprises the XPAN time windows and a plurality of infra time windows, the plurality of infra time windows defining time periods during which communications between an access point and the central device are allowed, and wherein a grant for time periods for one or more respective infra time windows is based on an XPAN channel usage.

7. The peripheral device of claim 6, wherein the one or more processors are individually or collectively configured to:

transmit, based at least in part on the TWT, an authentication message and an association request in a second XPAN time window and not in an infra time window; and receive an association response in the second XPAN time.

8. The peripheral device of claim 6, wherein the TWT indicates a service period and a service interval for XPAN time windows.

9. The peripheral device of claim 8, wherein the one or more processors are individually or collectively configured to transmit a communication during the service period.

10. The central device of claim 6, wherein the one or more processors are individually or collectively configured to transmit authentication messages in the XPAN time windows indicated by the TWT and not in the plurality of infra time windows.

11. The central device of claim 6, wherein the one or more processors are individually or collectively configured to transmit association messages in the XPAN time windows indicated by the TWT and not in the plurality of infra time windows.

12. The central device of claim 6, wherein the one or more processors are individually or collectively configured to transmit TWT setup messages in the XPAN time windows indicated by the TWT and not in the plurality of infra time windows.

13. A central device for wireless communication, comprising:

one or more memories; and one or more processors coupled to the one or more memories, the one or more processors individually or collectively configured to:

transmit, in a first extended personal area network (XPAN) time window and not in an infra time window, a beacon with a target wake time (TWT) that indicates XPAN time windows during which communications between a peripheral device and the central device are allowed;

receive, from the peripheral device, an authentication message and an association request in a second XPAN time window; and transmit, based at least in part on the authentication message and the association request being received in the second XPAN time window, an association response to the peripheral device in the second XPAN time window and not in an infra time window, the association response being associated with an existing target wake time session comprising the XPAN time windows and a plurality of infra time windows, the plurality of infra time windows defining time periods during which communications between an access point and the central device are allowed, and wherein a grant for time periods for one or more respective infra time windows is based on an XPAN channel usage.

14. The central device of claim 13, wherein the one or more processors, to transmit the beacon, are individually or collectively configured to broadcast the beacon.

15. The central device of claim 13, wherein the TWT indicates a service period and a service interval for the XPAN time windows.

16. A peripheral device for wireless communication, comprising:

one or more memories; and one or more processors coupled to the one or more memories, the one or more processors individually or collectively configured to:

receive, from a central device in a first extended personal area network (XPAN) time window and not in an infra time window, a beacon with a target wake time (TWT) that indicates XPAN time windows during which communications between the peripheral device and the central device are allowed;

transmit, based at least in part on the TWT, an authentication message and an association request in a second XPAN time window and not in an infra time window; and receive an association response in the second XPAN time window, the association response being associated with an existing target wake time session comprising the XPAN time windows and a plurality of infra time windows, the plurality of infra time windows defining time periods during which communications between an access point and the central device are allowed, and wherein a grant for time periods for one or more respective infra time windows is based on an XPAN channel usage.

17. The peripheral device of claim 16, wherein the one or more processors are individually or collectively configured to scanning for beacons based at least in part on a pattern for detecting beacons in an XPAN time window.

18. The peripheral device of claim 16, wherein the TWT indicates a service period and a service interval for the XPAN time windows.

19. The central device of claim 16, wherein the one or more processors are individually or collectively configured to transmit authentication messages in the XPAN time windows indicated by the TWT and not in the plurality of infra time windows.

20. The central device of claim 16, wherein the one or more processors are individually or collectively configured to transmit association messages in the XPAN time windows indicated by the TWT and not in the plurality of infra time windows.

21. The central device of claim 16, wherein the one or more processors are individually or collectively configured to transmit TWT setup messages in the XPAN time windows indicated by the TWT and not in the plurality of infra time windows.

\* \* \* \* \*